United States Patent
Wang et al.

(10) Patent No.: US 11,910,388 B2
(45) Date of Patent: Feb. 20, 2024

(54) UPLINK CONTROL CHANNEL CONFIGURATION FOR WIRELESS COMMUNICATIONS

(71) Applicant: QUALCOMM Incorporated, San Diego, CA (US)

(72) Inventors: Renqiu Wang, San Diego, CA (US); Peter Gaal, San Diego, CA (US); Hao Xu, Beijing (CN); Wanshi Chen, San Diego, CA (US); Joseph Binamira Soriaga, San Diego, CA (US); Jing Jiang, San Diego, CA (US); Yi Huang, San Diego, CA (US); Shimman Arvind Patel, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/933,099

(22) Filed: Mar. 22, 2018

(65) Prior Publication Data

US 2018/0279298 A1 Sep. 27, 2018

Related U.S. Application Data

(60) Provisional application No. 62/476,718, filed on Mar. 24, 2017.

(51) Int. Cl.
*H04W 72/04* (2023.01)
*H04L 5/00* (2006.01)
(Continued)

(52) U.S. Cl.
CPC ............ *H04W 72/21* (2023.01); *H04B 1/713* (2013.01); *H04B 1/7156* (2013.01);
(Continued)

(58) Field of Classification Search
CPC ........... H04W 72/0413; H04W 72/048; H04W 48/12; H04W 72/0446; H04B 1/7156; H04B 2201/698; H04L 5/0051
See application file for complete search history.

(56) References Cited

U.S. PATENT DOCUMENTS 9,191,165 B2 * 11/2015 Chen ..................... H04L 5/0055
9,420,584 B2 * 8/2016 Blankenship ..... H04W 72/0413
(Continued)

FOREIGN PATENT DOCUMENTS

WO    WO-2015050743 A1    4/2015
WO    WO-2015148001 A1    10/2015
(Continued)

OTHER PUBLICATIONS

Nokia et al., "On the Long PUCCH Formats for NR", 3GPP Draft; R1-1703320_LongPUCCHFormats_Final, 3rd Generation Partnership Project (3gpp), Mobile Competence Centre; 650, Route Des Lucioles; F-06921 Sophia-Antipol, vol. RAN WG1, No. Athens, Greece; Feb. 13, 2017-Feb. 17, 2017, Feb. 12, 2017, XP051210450, Retrieved from the Internet: URL:http://www.3gpp.org/ftp/Meetings_3GPP_SYNC/RAN1/Docs/ [retrieved on Feb. 12, 2017], 4 pages.
(Continued)

*Primary Examiner* — Bailor C Hsu
(74) *Attorney, Agent, or Firm* — Holland & Hart LLP

(57) ABSTRACT

Methods, systems, and apparatuses for wireless communication are described. In some wireless systems (e.g., new radio (NR) systems), a system may employ fixed or variable length uplink burst regions (e.g., in an uplink-centric slot). The base station may semi-statically or dynamically configure a user equipment (UE) or group of UEs for uplink control channel transmissions within an uplink burst region. In semi-static configuration, the UE may determine the uplink control channel transmission based on values transmitted or indicated via higher-layer signaling or based on
(Continued)

default values. In dynamic configuration, the UE may receive an indication of actual resources used by the base station in a physical layer message. The UE may transmit using an uplink control channel transmission based on the indication. In some cases, the base station may allocate code division multiplexing (CDM) groups based on which UEs are semi-statically configured and which are dynamically configured.

36 Claims, 20 Drawing Sheets

(51) Int. Cl.
| | |
|---|---|
| *H04B 1/7156* | (2011.01) |
| *H04W 48/12* | (2009.01) |
| *H04W 72/21* | (2023.01) |
| *H04L 1/00* | (2006.01) |
| *H04B 1/713* | (2011.01) |
| *H04W 72/51* | (2023.01) |
| *H04W 72/0446* | (2023.01) |

(52) U.S. Cl.
CPC .......... *H04L 1/0026* (2013.01); *H04L 1/0027* (2013.01); *H04L 5/0051* (2013.01); *H04L 5/0053* (2013.01); *H04W 72/51* (2023.01); *H04B 2201/698* (2013.01); *H04L 1/0031* (2013.01); *H04L 5/0092* (2013.01); *H04W 48/12* (2013.01); *H04W 72/0446* (2013.01)

(56) References Cited

U.S. PATENT DOCUMENTS

| | | | |
|---|---|---|---|
| 9,949,275 B2 | 4/2018 | Chen et al. | |
| 10,135,595 B2* | 11/2018 | Gerstenberger | H04L 5/001 |
| 2009/0238241 A1* | 9/2009 | Hooli | H04L 5/0012 |
| | | | 375/E1.033 |
| 2010/0272019 A1* | 10/2010 | Papasakellariou | H04B 7/0417 |
| | | | 370/328 |
| 2012/0281680 A1* | 11/2012 | Bostrom | H04W 72/0446 |
| | | | 370/336 |
| 2013/0039284 A1* | 2/2013 | Marinier | H04L 5/001 |
| | | | 370/329 |
| 2013/0114554 A1* | 5/2013 | Yang | H04W 24/10 |
| | | | 370/329 |
| 2013/0155978 A1* | 6/2013 | Choi | H04L 1/0027 |
| | | | 370/329 |
| 2013/0250924 A1* | 9/2013 | Chen | H04L 1/1819 |
| | | | 370/336 |
| 2014/0056273 A1 | 2/2014 | Jang et al. | |
| 2015/0049740 A1* | 2/2015 | Lee | H04W 72/1268 |
| | | | 370/336 |
| 2015/0092624 A1* | 4/2015 | Yao | H04L 5/1461 |
| | | | 370/278 |
| 2015/0327263 A1* | 11/2015 | Chen | H04W 72/0446 |
| | | | 370/280 |
| 2016/0157248 A1* | 6/2016 | Lin | H04W 24/00 |
| | | | 370/329 |
| 2016/0345118 A1* | 11/2016 | Oh | H04W 48/12 |
| 2016/0353430 A1 | 12/2016 | Chen et al. | |
| 2017/0230994 A1* | 8/2017 | You | H04W 72/042 |
| 2017/0290008 A1* | 10/2017 | Tooher | H04L 1/0007 |
| 2017/0366311 A1* | 12/2017 | Iyer | H04B 7/0482 |
| 2018/0063820 A1* | 3/2018 | Xiong | H04W 72/042 |
| 2018/0124815 A1* | 5/2018 | Papasakellariou | H04L 1/1861 |
| 2018/0192417 A1* | 7/2018 | Yin | H04L 5/005 |
| 2018/0220415 A1* | 8/2018 | Yin | H04W 72/0413 |
| 2018/0359760 A1* | 12/2018 | Su | H04W 72/082 |
| 2018/0376473 A1* | 12/2018 | Wang | H04L 5/0055 |
| 2019/0081763 A1* | 3/2019 | Akkarakaran | H04L 1/1812 |
| 2019/0103947 A1* | 4/2019 | Park | H04L 1/1861 |
| 2019/0124647 A1* | 4/2019 | Li | H04L 1/1825 |
| 2019/0141698 A1* | 5/2019 | Kim | H04L 5/001 |
| 2019/0222255 A1* | 7/2019 | Nammi | H04L 1/1896 |
| 2020/0008189 A1* | 1/2020 | Yin | H04L 1/1858 |

FOREIGN PATENT DOCUMENTS

| | | |
|---|---|---|
| WO | WO-2016048593 A1 | 3/2016 |
| WO | WO-2016171765 A1 | 10/2016 |

OTHER PUBLICATIONS

Partial International Search Report—PCT/US2018/024147—ISA/EPO—dated Jul. 5, 2018.
International Search Report and Written Opinion—PCT/US2018/024147—ISA/EPO—dated Aug. 28, 2018.
ZTE: "NR UL Control Channel Structure", 3GPP Draft; R1-1611291 NR UL Control Channel Structure, 3rd Generation Partnership Project (3gpp), Mobile Competence Centre; 650, Route Des Lucioles; F-06921 Sophia-Antipol, vol. RAN WG1, No. Renot USA; Nov. 14, 2016-Nov. 18, 2016, Nov. 13, 2016, XP051175272, Retrieved from the Internet: URL:http://www.3gpp.org/ftp/Meetings_3GPP_SYNC/RAN1/Docs/ [retrieved on Nov. 13, 2016], 7 pages.
Guangdong Oppo Mobile Telecom: "On Duration Aspects of NR PUCCH with long Duration", 3GPP TSG RAN WG1 #88, 3GPP Draft, R1-1701956, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 13, 2017-Feb. 17, 2017, 5 Pages, Feb. 7, 2017, XP051220927, Retrieved from the Internet: URL: http://www.3gpp.org/ftp/tsg_ran/WG1_RL1/TSGR1_88/Docs/R1-1701956.zip [retrieved on Feb. 7, 2017].
Taiwan Search Report—TW107110053—TIPO—dated Oct. 27, 2021.
NTT DOCOMO INC: "Summary of [87-32]: UL L1/L2 Control Channel Design for NR", R1-1700618, 3GPP TSG RAN WG1 AH_NR Meeting, Spokane, USA Jan. 16-20, 2017, Jan. 19, 2017, XP051208710, 30 Pages, paragraph [03.4].

\* cited by examiner

UPLINK CONTROL CHANNEL CONFIGURATION FOR WIRELESS COMMUNICATIONS

CROSS REFERENCES

The present Application for Patent claims priority to U.S. Provisional Patent Application No. 62/476,718 by Wang et al., entitled "Uplink Control Channel Configuration For New Radio (NR) Wireless Communication System," filed Mar. 24, 2017, assigned to the assignee hereof.

BACKGROUND

The following relates generally to wireless communication and more specifically to uplink control channel configurations for wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system or a new radio (NR) system). A wireless multiple-access communications system may include a number of base stations or access network nodes, each simultaneously supporting communication for multiple communication devices, which may be otherwise known as user equipment (UE).

In some wireless systems (e.g., NR systems), transmission time intervals (TTIs) may have different duration uplink portions, downlink portions, or both. Whether a TTI is uplink or downlink-centric may vary from one TTI to another. The available resources for uplink control information may thus vary from TTI to TTI.

SUMMARY

A network may semi-statically or dynamically configure a user equipment (UE) or group of UEs for uplink control channel transmissions within an uplink-centric transmission time interval (TTI). In a semi-static configuration, the UE may determine the uplink control channel transmission based on values transmitted or indicated via higher-layer signaling or based on default values. In a dynamic configuration, the UE may receive an indication of actual resources used by the base station in a physical layer message. The UE may transmit using an uplink control channel transmission based on the indication. In some cases, the base station may allocate code division multiplexing (CDM) groups based on which UEs are semi-statically configured and which are dynamically configured. The duration of the uplink control may depend on available resources (e.g., uplink symbols), UE capability, network characteristics, or the like.

A method of wireless communication is described. The method may include receiving an indication of an uplink control channel configuration, identifying uplink control information (UCI) for transmission during a first uplink portion of a TTI that has a downlink portion, the first uplink portion, and a second uplink portion, where the first uplink portion has a longer duration than the second uplink portion, and transmitting the UCI during the first uplink portion or the second uplink portion of the TTI according to the uplink control channel configuration.

An apparatus for wireless communication is described. The apparatus may include means for receiving an indication of an uplink control channel configuration, means for identifying UCI for transmission during a first uplink portion of a TTI that has a downlink portion, the first uplink portion, and a second uplink portion, where the first uplink portion has a longer duration than the second uplink portion, and means for transmitting the UCI during the first uplink portion or the second uplink portion of the TTI according to the uplink control channel configuration.

Another apparatus for wireless communication is described. The apparatus may include a processor, memory in electronic communication with the processor, and instructions stored in the memory. The instructions may be operable to cause the processor to receive an indication of an uplink control channel configuration, identify UCI for transmission during a first uplink portion of a TTI that has a downlink portion, the first uplink portion, and a second uplink portion, where the first uplink portion has a longer duration than the second uplink portion, and transmit the UCI during the first uplink portion or the second uplink portion of the TTI according to the uplink control channel configuration.

A non-transitory computer readable medium for wireless communication is described. The non-transitory computer-readable medium may include instructions operable to cause a processor to receive an indication of an uplink control channel configuration, identify UCI for transmission during a first uplink portion of a TTI that has a downlink portion, the first uplink portion, and a second uplink portion, where the first uplink portion has a longer duration than the second uplink portion, and transmit the UCI during the first uplink portion or the second uplink portion of the TTI according to the uplink control channel configuration.

Some examples of the method, apparatus, and non-transitory computer-readable medium described above may further include processes, features, means, or instructions for transmitting an indication of UE capability, where the indication of the uplink control channel configuration may be based at least in part on the UE capability.

Some examples of the method, apparatus, and non-transitory computer-readable medium described above may further include processes, features, means, or instructions for determining a hopping pattern for transmission of the UCI within the first uplink portion, the hopping pattern selected from a set of hopping patterns based at least in part on a payload size of the UCI.

Some examples of the method, apparatus, and non-transitory computer-readable medium described above may further include processes, features, means, or instructions for determining a symbol index for a demodulation reference signal (DMRS) for the hopping pattern, where the symbol index includes a same value for each hopping pattern of the set of hopping patterns.

In some examples of the method, apparatus, and non-transitory computer-readable medium described above, at least a portion of an uplink control channel having the uplink control channel configuration overlaps at least a portion of a gap interval between the downlink portion and the first uplink portion of the TTI.

In some examples of the method, apparatus, and non-transitory computer-readable medium described above, the uplink control channel configuration includes a first code for multiplexing UEs during the gap interval and a second code for multiplexing UEs during the first uplink portion of the TTI.

In some examples of the method, apparatus, and non-transitory computer-readable medium described above, transmitting the UCI includes transmitting a first portion of the UCI during the first uplink portion and a second portion during the second uplink portion of the TTI.

In some examples of the method, apparatus, and non-transitory computer-readable medium described above, receiving the indication includes receiving the indication via a physical layer message.

In some examples of the method, apparatus, and non-transitory computer-readable medium described above, the physical layer message includes at least one of a physical control format indicator channel (PCFICH) or a physical downlink control channel (PDCCH).

In some examples of the method, apparatus, and non-transitory computer-readable medium described above, the indication indicates a number of orthogonal frequency division multiplexing (OFDM) symbols of the uplink control channel configuration, a number of OFDM symbols of the first uplink portion of the TTI, a number of OFDM symbols of the second uplink portion of the TTI, or a number of OFDM symbols of the downlink portion of the TTI, or any combination thereof.

In some examples of the method, apparatus, and non-transitory computer-readable medium described above, the physical layer message includes a UE-specific PDCCH message.

In some examples of the method, apparatus, and non-transitory computer-readable medium described above, the physical layer message includes a common PDCCH message.

In some examples of the method, apparatus, and non-transitory computer-readable medium described above, the uplink control channel configuration may be based at least in part on a number of symbols of the downlink portion of the TTI occupied by the PDCCH or a number of symbols of the second uplink portion of the TTI, or both.

In some examples of the method, apparatus, and non-transitory computer-readable medium described above, the indication may be received via a system information block (SIB) or radio resource control (RRC) signaling.

A method of wireless communication is described. The method may include transmitting an indication of an uplink control channel configuration and receiving UCI according to the uplink control channel configuration during a first uplink portion of a TTI that has a downlink portion, the first uplink portion, and a second uplink portion, where the first uplink portion has a longer duration than the second uplink portion.

An apparatus for wireless communication is described. The apparatus may include means for transmitting an indication of an uplink control channel configuration and means for receiving UCI according to the uplink control channel configuration during a first uplink portion of a TTI that has a downlink portion, the first uplink portion, and a second uplink portion, where the first uplink portion has a longer duration than the second uplink portion.

Another apparatus for wireless communication is described. The apparatus may include a processor, memory in electronic communication with the processor, and instructions stored in the memory. The instructions may be operable to cause the processor to transmit an indication of an uplink control channel configuration and receive UCI according to the uplink control channel configuration during a first uplink portion of a TTI that has a downlink portion, the first uplink portion, and a second uplink portion, where the first uplink portion has a longer duration than the second uplink portion.

A non-transitory computer readable medium for wireless communication is described. The non-transitory computer-readable medium may include instructions operable to cause a processor to transmit an indication of an uplink control channel configuration and receive UCI according to the uplink control channel configuration during a first uplink portion of a TTI that has a downlink portion, the first uplink portion, and a second uplink portion, where the first uplink portion has a longer duration than the second uplink portion.

Some examples of the method, apparatus, and non-transitory computer-readable medium described above may further include processes, features, means, or instructions for receiving an indication of a UE capability, where the indication of the uplink control channel configuration may be based at least in part on the UE capability.

Some examples of the method, apparatus, and non-transitory computer-readable medium described above may further include processes, features, means, or instructions for determining a hopping pattern for transmission of the UCI within the first uplink portion, the hopping pattern selected from a set of hopping patterns based at least in part on a payload size of the UCI.

Some examples of the method, apparatus, and non-transitory computer-readable medium described above may further include processes, features, means, or instructions for determining a symbol index for a DMRS for the hopping pattern, where the symbol index may be includes a same value for each hopping pattern of the set of hopping patterns.

In some examples of the method, apparatus, and non-transitory computer-readable medium described above, at least a portion of an uplink control channel having the uplink control channel configuration overlaps at least a portion of a gap interval between the downlink portion and the first uplink portion of the TTI.

In some examples of the method, apparatus, and non-transitory computer-readable medium described above, the uplink control channel configuration includes a first code for multiplexing UEs during the gap interval and a second code for multiplexing UEs during the first uplink portion of the TTI.

In some examples of the method, apparatus, and non-transitory computer-readable medium described above, receiving the UCI includes receiving at least a first portion of the UCI during the first uplink portion and a second portion during the second uplink portion of the TTI.

In some examples of the method, apparatus, and non-transitory computer-readable medium described above, transmitting the indication includes transmitting the indication via a physical layer message.

In some examples of the method, apparatus, and non-transitory computer-readable medium described above, the physical layer message includes at least one of a PCFICH or a PDCCH.

In some examples of the method, apparatus, and non-transitory computer-readable medium described above, the indication indicates a number of OFDM symbols of the uplink control channel configuration, a number of OFDM symbols of the first uplink portion of the TTI, a number of OFDM symbols of the second uplink portion of the TTI, or a number of OFDM symbols of the downlink portion of the TTI, or any combination thereof.

In some examples of the method, apparatus, and non-transitory computer-readable medium described above, the physical layer message includes a UE-specific PDCCH message.

In some examples of the method, apparatus, and non-transitory computer-readable medium described above, the uplink control channel configuration may be based at least in part on a number of symbols of the downlink portion of the TTI occupied by the PDCCH or a number of symbols of the second uplink portion of the TTI, or both.

In some examples of the method, apparatus, and non-transitory computer-readable medium described above, the indication may be transmitted via an SIB or RRC signaling.

A method of wireless communication is described. The method may include identifying UCI for transmission, determining a set of uplink resources for transmission of the UCI based at least in part on a payload size of the UCI, and transmitting the UCI using the set of uplink resources.

An apparatus for wireless communication is described. The apparatus may include means for identifying UCI for transmission, means for determining a set of uplink resources for transmission of the UCI based at least in part on a payload size of the UCI, and means for transmitting the UCI using the set of uplink resources.

Another apparatus for wireless communication is described. The apparatus may include a processor, memory in electronic communication with the processor, and instructions stored in the memory. The instructions may be operable to cause the processor to identify UCI for transmission, determine a set of uplink resources for transmission of the UCI based at least in part on a payload size of the UCI, and transmit the UCI using the set of uplink resources.

A non-transitory computer readable medium for wireless communication is described. The non-transitory computer-readable medium may include instructions operable to cause a processor to identify UCI for transmission, determine a set of uplink resources for transmission of the UCI based at least in part on a payload size of the UCI, and transmit the UCI using the set of uplink resources.

In some examples of the method, apparatus, and non-transitory computer-readable medium described above, the set of uplink resources includes at least one of a set of physical uplink control channel (PUCCH) resources and a set of physical uplink shared channel (PUSCH) resources.

In some examples of the method, apparatus, and non-transitory computer-readable medium described above, the set of uplink resources includes a plurality of channel structures or a plurality of coding schemes, or both.

Some examples of the method, apparatus, and non-transitory computer-readable medium described above may further include processes, features, means, or instructions for segmenting the UCI using a plurality of polar codes, where transmitting the UCI may be based at least in part on the segmenting.

Some examples of the method, apparatus, and non-transitory computer-readable medium described above may further include processes, features, means, or instructions for comparing the payload size of the UCI to one or more payload thresholds, where the set of uplink resources may be determined based at least in part on the comparing.

In some examples of the method, apparatus, and non-transitory computer-readable medium described above, the set of resources includes an uplink control channel having a first duration, an uplink control channel having a second duration longer than the first duration, an uplink shared channel having a third duration, or an uplink shared channel having a fourth duration that may be longer than the third duration in a system that supports uplink TTIs of the first, second, third, and fourth durations.

In some examples of the method, apparatus, and non-transitory computer-readable medium described above, comparing the payload size includes determining that the payload size may be within a range defined by a first payload threshold and a second payload threshold.

A method of wireless communication is described. The method may include identifying a set of resources for reception of UCI from a UE, where the set of resources are determined based at least in part on a payload size of the UCI and receiving, over the set of resources, the UCI from the UE.

An apparatus for wireless communication is described. The apparatus may include means for identifying a set of resources for reception of UCI from a UE, where the set of resources are determined based at least in part on a payload size of the UCI and means for receiving, over the set of resources, the UCI from the UE.

Another apparatus for wireless communication is described. The apparatus may include a processor, memory in electronic communication with the processor, and instructions stored in the memory. The instructions may be operable to cause the processor to identify a set of resources for reception of UCI from a UE, where the set of resources are determined based at least in part on a payload size of the UCI and receive, over the set of resources, the UCI from the UE.

A non-transitory computer readable medium for wireless communication is described. The non-transitory computer-readable medium may include instructions operable to cause a processor to identify a set of resources for reception of UCI from a UE, where the set of resources are determined based at least in part on a payload size of the UCI and receive, over the set of resources, the UCI from the UE.

In some examples of the method, apparatus, and non-transitory computer-readable medium described above, the set of resources includes at least one of a set of PUCCH resources and a set of PUSCH resources.

In some examples of the method, apparatus, and non-transitory computer-readable medium described above, the set of resources includes a plurality of channel structures or a plurality of coding schemes, or both.

In some examples of the method, apparatus, and non-transitory computer-readable medium described above, receiving the UCI includes receiving multiple segments of the UCI using a plurality of polar codes.

In some examples of the method, apparatus, and non-transitory computer-readable medium described above, the set of resources includes an uplink control channel having a first duration, an uplink control channel having a second duration longer than the first duration, an uplink shared channel having a third duration, or an uplink shared channel having a fourth duration that may be longer than the third duration in a system that supports uplink TTIs of the first, second, third, and fourth durations.

DETAILED DESCRIPTION

Figure 1:
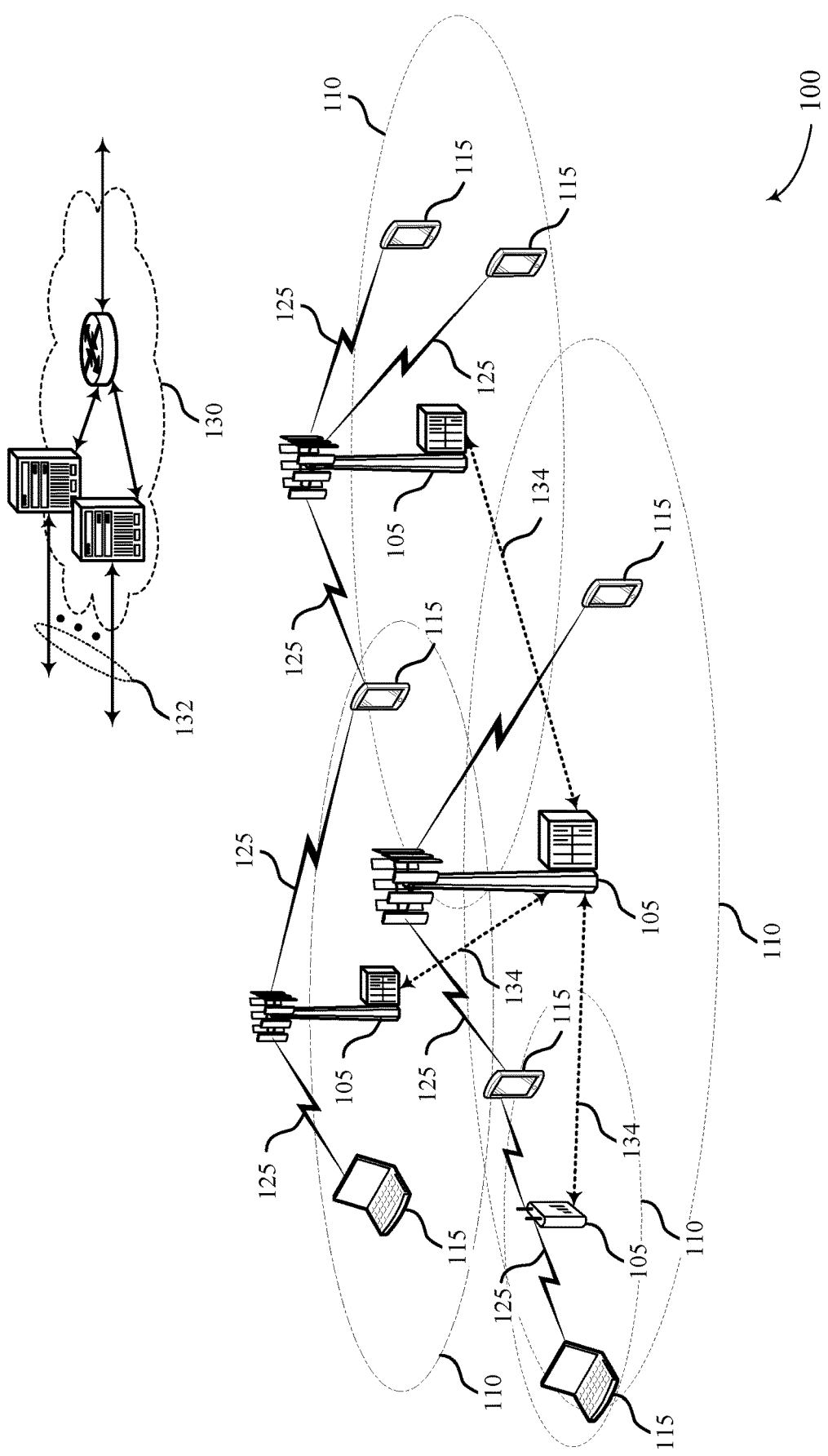
FIG. 1 illustrates an example of a system for wireless communication that supports uplink control channel configurations for wireless communications in accordance with aspects of the present disclosure.

A network may semi-statically or dynamically configure a user equipment (UE) or group of UEs for uplink control channel transmissions within an uplink-centric transmission time interval (TTI). The UE may be receive an indication of an uplink control channel configuration with broadcast information, higher layer dedicated signaling, or a physical layer message (e.g., in downlink control information (DCI)) in various examples.

By way of example, in some wireless systems (e.g., new radio (NR) systems), a base station may implement fixed or variable length uplink long burst regions in uplink transmission TTIs, which may be referred to as uplink-centric TTIs or uplink-centric slots. Additionally, the lengths of downlink control regions (e.g., physical downlink control channel (PDCCH) regions) and uplink short burst (ULSB) regions within the TTI may result in variable length uplink long burst regions. The base station may transmit uplink control configuration information to a UE or a group of UEs so that the UE(s) may efficiently transmit long uplink control transmissions (e.g., long physical uplink control channel (PUCCH) transmissions) in the variable length uplink long burst regions.

The base station may semi-statically or dynamically configure the UEs for PUCCH transmissions. For example, the base station may transmit default starting and ending values for the PUCCH transmissions in a system information block (SIB) or in radio resource control (RRC) signaling. The semi-static configuration may schedule the PUCCH transmissions within the uplink long burst region, and may or may not extend into the PDCCH or ULSB regions, as discussed below.

In a dynamic configuration, the base station may transmit an indication of the actual resources used in the PDCCH region or allocated to UEs in the ULSB region. For example, the base station may transmit the indication in the physical control format indicator channel (PCFICH) or PDCCH. Depending on UE capabilities, a UE may decode the indication, and may dynamically configure the PUCCH transmission based on the indication. The dynamically configured UE may use the resources of the uplink TTI more efficiently.

In some cases, a UE may have more uplink control information (UCI) to transmit than resources allocated for a PUCCH transmission. In this case, the UE may determine how to transmit the UCI based on a payload size of the UCI. For example, the UE may transmit the UCI in short PUCCH, long PUCCH, short physical uplink shared channel (PUSCH), or long PUSCH based on the payload size of the UCI. In other cases, the UE may transmit the UCI across multiple PUCCH transmissions, or may modify the encoding process for the UCI.

Aspects of the disclosure are initially described in the context of wireless communications systems. Further aspects of the disclosure are described with reference to TTI and PUCCH configurations. Aspects of the disclosure are also illustrated by and described with reference to process flows, apparatus diagrams, system diagrams, and flowcharts that relate to uplink control channel configurations for wireless communications.

FIG. 1 illustrates an example of a wireless communications system 100 that supports uplink control channel configurations for wireless communications in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or an NR network. In some cases, wireless communications system 100 may support enhanced broadband communications, ultra-reliable (i.e., mission critical) communications, low latency communications, and communications with low-cost and low-complexity devices. The wireless communications system 100 (e.g., an NR system) may implement a PUCCH long burst design. A base station 105 may semi-statically or dynamically configure one or more UEs 115 to transmit PUCCH messages within a portion of a slot or TTI, which may have a long uplink burst portion followed by a short uplink burst portion. In some cases, the base station 105 may configure a UE 115 to extend the PUCCH based on UE capabilities, actual resources used, or a combination thereof.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a TTI of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Base stations 105 may communicate with the core network 130 and with one another. For example, base stations 105 may interface with the core network 130 through backhaul links 132 (e.g., S1). Base stations 105 may communicate with one another over backhaul links 134 (e.g., X2) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) or next generation NodeBs (gNBs).

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, IP connectivity, and other access, routing, or mobility functions. At least some of the network devices may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105). An entity within the core network 130, or a base station 105, may determine a hopping pattern for uplink resources.

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming).

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid Automatic Repeat Request (HARD) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200\ T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs). As described herein, TTIs may be downlink-centric or uplink-centric.

A resource element may consist of one symbol period and one subcarrier (e.g., a 15 kHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for CA. CA may be used with both frequency division duplexing (FDD) and time division duplexing (TDD) component carriers.

In some cases, wireless communications system 100 may utilize enhanced CCs (eCCs). An eCC may be characterized by one or more features including: wider bandwidth, shorter symbol duration, shorter TTIs, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

As described herein, wireless communications system 100 may be configured to semi-statically or dynamically configure an uplink control channel. The duration of the uplink control channel, for example, may depend on a UE 115 capability, a duration of one or more portions of a TTI (e.g., a slot), link conditions, system characteristics, or the like.

Figure 2:
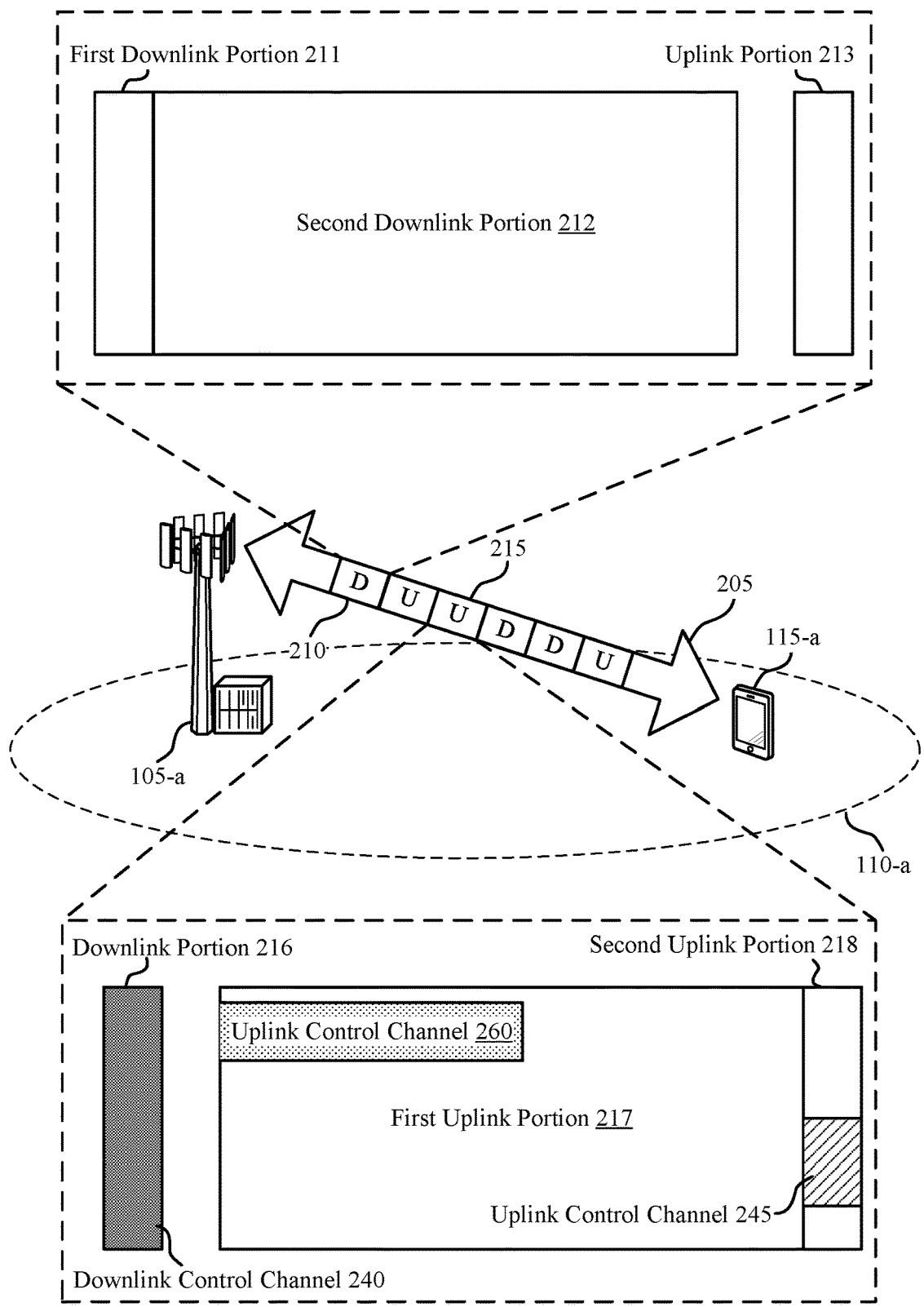
FIG. 2 illustrates an example of a wireless communication system that supports uplink control channel configurations for wireless communications in accordance with aspects of the present disclosure.

FIG. 2 illustrates an example of a wireless communications system 200 that supports uplink control channel configurations for wireless communications in accordance with various aspects of the present disclosure. Wireless communications system 200 may include UE 115-*a* and base station 105-*a*, which may be examples of a UE 115 and a base station 105 as described with reference to FIG. 1. Base station 105-*a* may provide communication coverage for a geographic coverage area 110-*a*, which may be an example of a coverage area 110 as described with reference to FIG. 1. UE 115-*a* and base station 105-*a* may communicate over communication link 205. In some cases, UE 115-*a* may transmit UCI to base station 105-*a* using a PUCCH long burst transmission.

Communication link 205 may be over a carrier configured with downlink-centric TTIs 210 and uplink-centric TTIs 215, which may be an example of a slot or a subframe. Downlink-centric TTI 210, which may also be referred to as a downlink TTI, may include a first downlink portion 211, a second downlink portion 212, an uplink portion 213, and a gap interval between the second downlink portion 212 and the uplink portion 213. First downlink portion 211 may include control information while second downlink portion 212 may be configured for data.

Uplink-centric TTI 215, which may also be referred to as an uplink TTI, may include a downlink portion 216, a first uplink portion 217, a second uplink portion 218 (which may have a shorter duration that the first uplink portion 217), and a gap interval between downlink portion 216 and first uplink portion 217. First uplink portion 217 may be referred to as an uplink long burst duration and second uplink portion 218 may be referred to as an ULSB duration. Uplink-centric TTI 215 may include a downlink control channel 240 in the downlink portion 216, an uplink control channel 260 in first uplink portion 217, or another uplink control channel 245 in the second uplink portion 218, or it may include any combination of such control channels. First uplink portion 217 may be configured for control transmission, data transmissions, or both.

In some cases (e.g., in LTE systems), a UE 115, such as UE 115-*a*, may transmit a PUCCH transmission (e.g., during first uplink portion 217). Base station 105-*a* may configure a PUCCH format or UE 115-*a* may select the PUCCH format for the transmission from a set of PUCCH formats (e.g., including PUCCH formats 1, 1a, 1b, 2, 2a, 2b, 3, 4, 5, or any other possible PUCCH format). In some cases, UE 115-*a* may select the PUCCH format based on a payload size of the PUCCH transmission, and the base station 105-*a* receiving the transmission may determine the PUCCH format based on the payload size.

In some examples, (e.g., in NR systems), a UE 115-*a* or base station 105-*a* may schedule both uplink and downlink transmissions within each downlink-centric TTI 210 and/or uplink-centric TTI 215 (e.g., a slot) based on TDD. For example, each uplink-centric TTI 215 may reserve a majority of symbols for uplink transmission (e.g., in an uplink long burst region), and each downlink-centric TTI 210 may reserve a majority of symbols for downlink transmission (e.g., in a physical downlink shared channel (PDSCH) region). However, both uplink-centric TTIs 215 and downlink-centric TTIs 210 may contain partial TTIs (e.g., one or more symbols) reserved for uplink information and partial TTIs reserved for downlink information. For example, as discussed, both uplink-centric TTIs 215 and downlink-centric TTIs 210 may include a PDCCH region for downlink transmissions and an ULSB region for uplink transmissions. In some cases, the PDCCH region may be the initial region of the TTI and the ULSB region may be the final region of the downlink-centric TTI 210 or uplink-centric TTI 215. In the PDCCH region, base station 105-*a* may transmit DCI over the PDCCH to one or more UEs 115. In the ULSB region, a UE 115, such as UE 115-*a*, may transmit UCI or small amounts (e.g., a few bits) of additional uplink data to base station 105-*a*. The downlink-centric TTI 210 or uplink-centric TTI 215 may also include a gap, which may be used as a buffer for switching between uplink and downlink transmissions within the downlink-centric TTI 210 or uplink-centric TTI 215.

In some cases, base station 105-*a* or UE 115-*a* may aggregate consecutive uplink-centric TTIs 215 or downlink-centric TTIs 210 together. For example, if the TTIs are examples of slots, base station 105-*a* or UE 115-*a* may aggregate multiple slots together for transmission. In these cases, base station 105-*a* or UE 115-*a* may reduce the number of occurrences of PDCCH or ULSB regions. For example, for an aggregation of downlink-centric TTIs 210, base station 105-*a* may include one ULSB region for the entire aggregate downlink transmission, rather than a ULSB region for each downlink-centric TTI 210. The aggregate downlink transmission may include multiple PDCCH regions and PDSCH regions, followed by a single gap and ULSB region. In some cases, the aggregate downlink transmission may also include just one PDCCH region, and may utilize the other symbols normally reserved for PDCCH regions as extensions of the PDSCH regions. Similarly, an aggregation of uplink-centric TTIs 215 may include one PDCCH region for the entire aggregate uplink transmission, rather than a PDCCH region for each uplink-centric TTI 215. The aggregate uplink transmission may include a single PDCCH region and gap, and multiple uplink long burst regions and ULSB regions. In some cases, the aggregate uplink transmission may also include just one ULSB region, and may utilize the other symbols normally reserved for ULSB regions as extensions of the uplink long burst regions. By reducing the number of occurrences of the PDCCH or ULSB regions, base station 105-*a* or UE 115-*a* may reduce the number of gaps in the transmissions, lowering the overhead associated with transmission.

Different base stations 105 may schedule different uplink long burst durations in uplink-centric TTIs 215 and may thus configure uplink control channel 260 accordingly. An uplink long burst duration may be based on a PDCCH region duration. Base station 105-*a* may set a default duration value (e.g., two symbols) for the PDCCH region. In some cases, the actual region used for PDCCH transmission may change dynamically based on the DCI to transmit. For example, base station 105-*a* may utilize a region of any duration up to the set default duration value (e.g., base station 105-*a* may use one symbol of the two symbol default duration). Base station 105-*a* may indicate the actual region used for PDCCH transmission in the PCFICH. In some cases, UE 115-*a* may decode the control format indicators (CFIs) in the PCFICH and determine the actual region used for PDCCH, while in other cases, UE 115-*a* may not decode the PCFICH.

The uplink long burst duration, and thus the uplink control channel 260, may additionally be based on a ULSB region duration. For example, base station 105-*a* may set a default duration value (e.g., one or two symbols) for the ULSB region. The uplink long burst duration may also be based on the number of aggregated uplink-centric TTIs 215. For example, reducing the number of occurrences of PDCCH or ULSB regions may allow base station 105-*a* to combine uplink long burst regions across uplink-centric TTIs 215. Based on the above factors, base station 105-*a* may determine a number of symbols for an uplink long burst duration.

Base station 105-*a* may indicate a PDCCH region duration to UE 115-*a*. For example, base station 105-*a* may configure a semi-static default duration value for the PDCCH region in a SIB or in RRC signaling. In some cases, the default duration value may be sub-band dependent. In other cases, the default duration value may be constant across the entire bandwidth allocated for transmission. However, base station 105-*a* may dynamically configure a duration for the actual PDCCH region used for a transmission on a per transmission basis. Base station 105-*a* may indicate the actual PDCCH region duration for a transmission in the PCFICH. The actual PDCCH region duration may or may not be different for different sub-bands of the allocated bandwidth. If different sub-bands have different configurations for PDCCH region durations, the different sub-bands may support different start times for uplink long burst regions. In these cases, a UE 115 monitoring a first sub-band may have a different uplink long burst alignment than a UE 115 monitoring a second sub-band. In some cases, base station 105-*a* or UEs 115 may perform additional processes to maintain power control or phase continuity due to the different uplink long burst alignments.

Base station 105-*a* may also determine a ULSB region duration for UE 115-*a*. In some cases, base station 105-*a* may configure a different ULSB region duration for uplink and downlink-centric TTIs 210. If the uplink TTI ULSB region duration is one symbol longer than the downlink TTI ULSB region duration, base station 105-*a* and UE 115-*a* may avoid mixed interference due to the gap preceding the ULSB region in the downlink-centric TTI 210. Additionally or alternatively, base station 105-*a* may configure different ULSB region durations for different sub-bands within the allocated bandwidth. UEs 115 transmitting on different sub-bands, and therefore with different ULSB starting symbols, may result in power control issues. In other cases, base station 105-*a* may configure a constant ULSB region duration across the entire allocated bandwidth. Base station 105-*a* may semi-statically configure the ULSB region durations based on a format of a set of formats. In some cases, the set of formats may limit the possible combinations of TTIs and ULSB region durations. In other cases, base station 105-*a* may dynamically configure the ULSB region durations by transmitting an indication of the ULSB region duration for a transmission to UE 115-*a* in the PDCCH.

Base station 105-*a* may semi-statically or dynamically configure UE 115-*a* for UCI transmissions (e.g., PUCCH transmissions) in uplink-centric TTI 215 based on an uplink long burst region duration. For example, base station 105-*a* may transmit default starting and ending values for PUCCH transmissions in a SIB or in RRC signaling. The semi-static configuration may schedule the PUCCH transmissions within the uplink long burst region, and may not extend into the PDCCH or ULSB regions. Within the uplink long burst region, UE 115-*a* may perform frequency hopping for a PUCCH transmission.

In a dynamic configuration, base station 105-*a* may transmit an indication of the actual resources used in the PDCCH region or allocated to UEs 115 in the ULSB region. For example, base station 105-*a* may transmit the indication in the PCFICH or PDCCH. Depending on UE capabilities, UE 115-*a* may decode the indication, and may dynamically configure the PUCCH transmission based on the indication. For example, UE 115-*a* may receive an indication that base station 105-*a* transmitted PDCCH information in uplink-centric TTI 215 using fewer symbols than are designated for the default PDCCH region. In this case, UE 115-*a* may extend the PUCCH transmission to begin earlier while maintaining a gap for switching from downlink to uplink modes. Similarly, UE 115-*a* may receive an indication that there are unused resources within the designated ULSB region. UE 115-*a* may extend the PUCCH transmission into the unused resources. In this way, a dynamically configured UE 115 may use the resources of uplink-centric TTI 215 more efficiently.

UE 115-*a* may transmit the PUCCH transmission using code division multiplexing (CDM). In this way, base station 105-*a* may receive PUCCH transmissions from multiple users (e.g., in some cases up to 36 UEs 115) over the same frequencies or at the same time, and may differentiate the signals based on the CDM. UE 115-*a* may implement orthogonal cover codes (OCCs), which may employ Walsh code sequences. In some cases, the Walsh code sequences may be applied prior to a discrete Fourier transform (DFT). UE 115-*a* may also implement cyclic shifts, and may perform cyclic shift hopping within the TTI. For example, UE 115-*a* may use a first cyclic shift during a first part of the TTI (e.g., a first set of symbols) and may use a second cyclic shift during a second part of the TTI (e.g., a second set of symbols).

Base station 105-*a* or UE 115-*a* may modulate the transmission (e.g., using quadrature phase shift keying (QPSK)). When transmitting UCI, UE 115-*a* may first encode a set of information bits into a codeword using polar coding techniques. In some cases, the UCI may include a codeword containing up to a threshold number of bits (e.g., 1024 bits) that may be transmitted on the PUCCH. However, in some cases, UE 115-*a* may have more UCI (e.g., more information bits for polar coding) to transmit than can be encoded in the threshold number of bits. In these cases, UE 115-*a* may transmit more bits than the threshold number of bits of UCI.

In some cases, to transmit more bits than the threshold number of bits, UE 115-*a* may split the UCI across multiple codewords, where each of the multiple codewords may contain less bits than the threshold number of bits. In other cases, UE 115-*a* may implement a polar coding technique that may encode the information bits into a longer codeword (i.e., longer than the threshold number of bits). In yet other cases, UE 115-*a* may use a low density parity check (LDPC) coding technique rather than a polar coding technique to encode the codeword. In some cases, the LDPC coding technique may allow for more information bits to be encoded into the same length codeword. In this way, UE 115-*a* may transmit more UCI in the threshold number of bits.

In other cases, UE 115-*a* may transmit some or all of the UCI on the PUSCH, rather than on the PUCCH. In some cases, the PUSCH may carry a larger payload than the PUCCH due to its modulation process. For these transmissions, UE 115-*a* may transmit UCI and may not transmit uplink data on the PUSCH. UE 115-*a* may use either LDPC coding techniques or polar coding techniques for encoding the PUSCH transmission. UE 115-*a* may determine the channel to transfer the UCI on based on the UCI payload size, a relative position of the UE within the coverage cell of the base station, or a combination thereof.

UE 115-*a* may identify one or more thresholds for comparing the UCI payload size. For example, UE 115-*a* may identify a first threshold payload size and a second threshold payload size, where the second threshold payload size is larger than the first. If the UCI payload size is smaller than the first threshold payload size, UE 115-*a* may transmit the UCI using short or long PUCCH. For example, a UE 115 near the edge of coverage area 110-*a* may transmit the UCI using long PUCCH, and a UE 115 near the center of coverage area 110-*a* may transmit the UCI using short PUCCH. If the UCI payload size is larger than the first threshold payload size but smaller than the second threshold payload size, UE 115-*a* may transmit using long PUCCH or short PUSCH. For example, a UE 115 near the edge of coverage area 110-*a* may transmit the UCI using long PUCCH, and a UE 115 near the center of coverage area 110-*a* may transmit the UCI using short PUSCH. If the UCI payload size is larger than the second threshold payload size, UE 115-*a* may transmit the UCI using long PUSCH.

Figure 3:
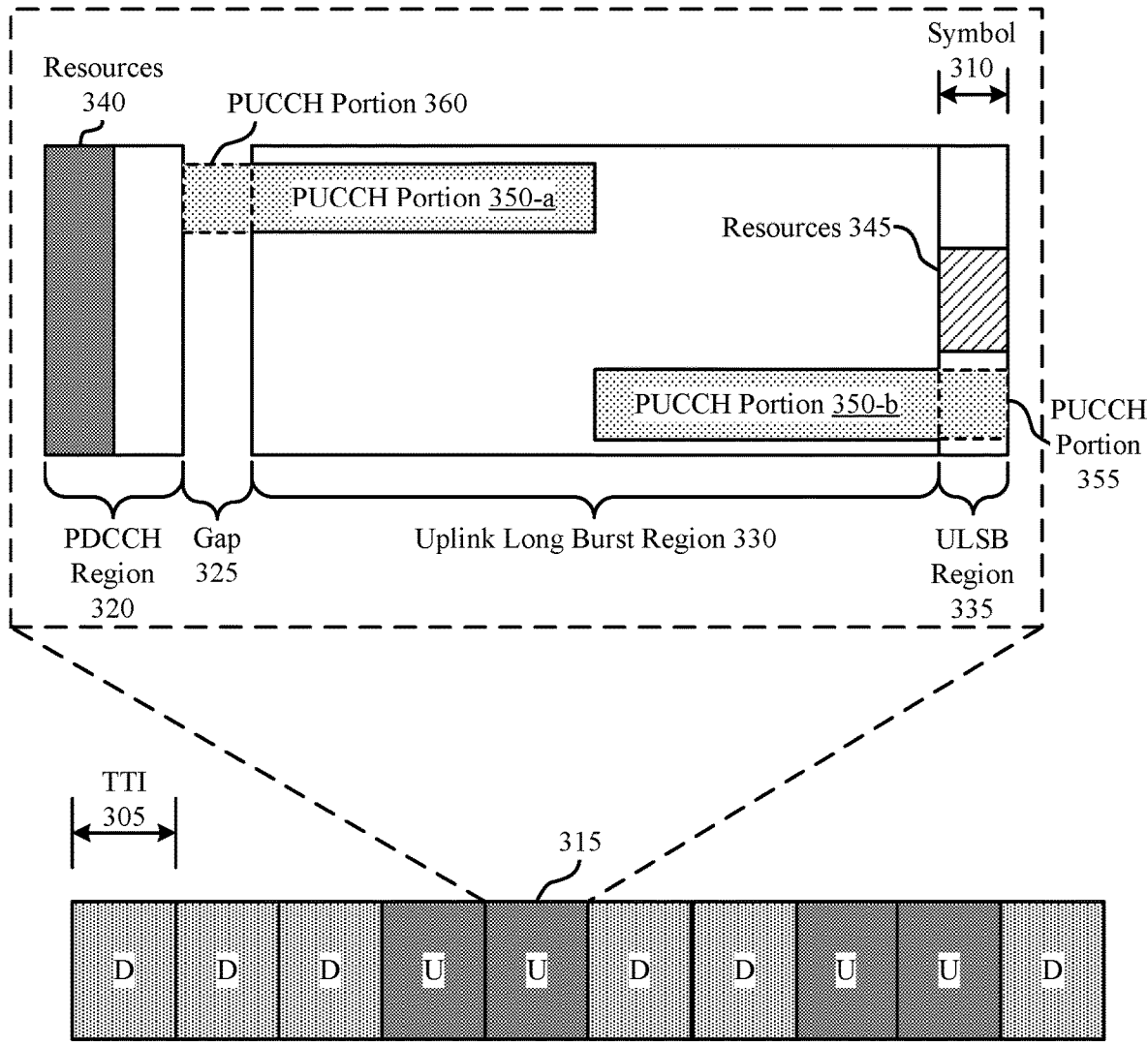
FIG. 3 illustrates an example of a transmission time interval (TTI) configuration that supports uplink control channel configurations for wireless communications in accordance with aspects of the present disclosure.

FIG. 3 illustrates an example of a TTI configuration 300 that supports uplink control channel configurations for wireless communications in accordance with various aspects of the present disclosure. TTI configuration 300 may include multiple TTIs 305, each of which may include a number of symbols 310. In some cases, multiple TTIs 305 of a same type may be aggregated (e.g., the first three downlink TTIs 305). A configurable uplink TTI 315 may be semi-statically or dynamically configured, for example by a base station 105 as described with reference to FIGS. 1 and 2. The configurable uplink TTI 315 may include a default PDCCH region 320, a scheduled gap 325, an uplink long burst region 330, and a default ULSB region 335.

In some cases, a base station 105 may semi-statically configure the duration of PUCCH portions 350 for an uplink long burst region 330. The duration may be based on the number of symbols 310 of the uplink long burst region 330, which may vary from base station to base station. For example, semi-statically configured PUCCH portions 350 may be the same for any uplink long burst regions 330 with the same durations. In the semi-static configuration, the PUCCH portions 350 may start and end at default locations. For example, the PUCCH portions 350 may start at the beginning of the uplink long burst region 330 (e.g., after the scheduled gap 325). In some cases, the PUCCH portions 350 may perform one or more frequency hops in the uplink long burst region 330 (e.g., the switch from PUCCH portion 350-*a* to PUCCH portion 350-*b*). The PUCCH portions 350 may end at the end of the uplink long burst region 330 (e.g., before the default ULSB region 335).

In some cases, ULSB region 335 may span the entire allocated bandwidth, and a UE 115 may transmit uplink information in any resource blocks (RBs) within the allocated bandwidth. In other cases, the default ULSB region 335 may not span the entire allocated bandwidth, and instead may span a designated sub-band (e.g., a sub-band including resources 345). In these cases, the PUCCH portions 350 may extend into one or more symbols 310 used for ULSB (e.g., with additional PUCCH portion 355), where the PUCCH portions 350 may use a different sub-band than the sub-band designated as the default ULSB region 335.

In the case of semi-static configuration, a UE 115 may not decode PCFICH or PDCCH. For example, the UE 115 may not include the capability to decode the PCFICH, or may optionally not decode the PCFICH. The UE 115 may determine the PUCCH portions 350 configuration based on the default start and end times, and may not need to receive signals indicating the start and end times. Additionally, each UE 115 may have the same duration for PUCCH portions 350, which may allow the base station to perform multiplexing with time domain spreading.

In other cases, the base station 105 may dynamically configure the PUCCH portions 350 duration based on the actual regions used for PDCCH and ULSB transmissions. A UE 115 may include the capability to decode information in the PCFICH and the PDCCH. The UE may decode the PCFICH and the PDCCH, and may determine the actual resources 340 and 345 used for PDCCH and ULSB transmissions.

In some cases, the actual resources 340 used for PDCCH transmission may be less than the default PDCCH region 320 resources. For example, the default PDCCH region 320 duration may be two symbols 310, but the base station 105 may transmit DCI on the PDCCH in the first symbol 310, and may not transmit DCI in the second symbol 310. In this case, the second symbol 310 of the default PDCCH region 320 may represent a gap in transmission, and may therefore function as a switching buffer between downlink and uplink transmission. The scheduled gap 325 may be redundant if a symbol 310 of the default PDCCH region 320 functions as a gap. The base station 105 may transmit an indication in the PCFICH that the actual resources 340 for the PDCCH transmission do not utilize the last symbol 310 of the default PDCCH region 320. The base station 105 may receive UE capabilities (e.g., previously in signaling messages) and may determine whether a UE 115 may decode the PCFICH based on the UE capabilities.

If the UE 115 is capable of decoding the PCFICH, the base station 105 may dynamically configure the PUCCH portions 350 to extend into the scheduled gap 325 (e.g., with additional PUCCH portion 360) before the uplink long burst region 330. The UE 115 may receive and decode the indication or the dynamic configuration in the PCFICH, and may start the PUCCH portions 350 in the symbol 310 semi-statically reserved as the scheduled gap 325. In some cases, the base station 105 may configure the PUCCH portions 350 to extend into the default PDCCH region 320, as long as a symbol 310 gap is maintained between the actual resources 340 used for PDCCH transmission and the start of the PUCCH portions 350. In this way, the UE 115 may more efficiently use the available resources in the configurable uplink TTI 315.

Similarly, in some cases, the actual resources 345 used for ULSB transmission may be less than the default ULSB region 335 resources. For example, the default ULSB region 335 may span the entire allocated bandwidth. However, the base station 105 may determine RBs within the bandwidth not allocated to any UE 115 for transmission. In some cases, the base station 105 may indicate the free RBs in either a UE-specific PDCCH message or the common PDCCH message. The base station 105 may dynamically configure a UE 115 to extend the PUCCH portions 350 into one or more of the free RBs in the symbols 310 semi-statically configured as the default ULSB region 335. The UE 115 may receive and decode the PDCCH, and may determine to extend the PUCCH portions 350 into the default ULSB region 335 (e.g., with additional PUCCH portion 355) based on the PDCCH.

In some cases, the base station 105 may group UEs 115 based on UE capabilities. For example, the base station 105 may group the UEs 115 into UEs 115 that may decode both the PCFICH and the PDCCH and UEs 115 that may not decode the PCFICH, the PDCCH, or both. The base station 105 may use the semi-static configuration of the PUCCH portions 350 duration for the group of UEs 115 that may not decode the PCFICH, the PDCCH, or both. The base station 105 may dynamically configure the PUCCH portions 350 duration for the group of UEs 115 that may decode both the PCFICH and the PDCCH.

In some cases (e.g., if the base station 105 performs CDM in the time domain), the base station 105 may configure the PUCCH portions 350 for each group in different sub-bands or RBs. In other cases (e.g., if the base station 105 performs CDM in the frequency domain), the base station 105 may configure the PUCCH portions 350 for each group in a same sub-band or RBs. In some cases, one UE 115 group may make up a first CDM group, where transmissions of the first CDM group may be orthogonal to transmissions of a second CDM group, which may include the second UE 115 group. In other cases, the base station 105 may include the UEs 115 with additional PUCCH portion 355 or 360 in a first CDM group for the additional PUCCH portion 355 or 360, and may include both UE 115 groups in a second or more CDM group for the overlapping portions (e.g., shown as PUCCH portions 350-a and 350-b) of the PUCCH portions 350.

Figure 4:
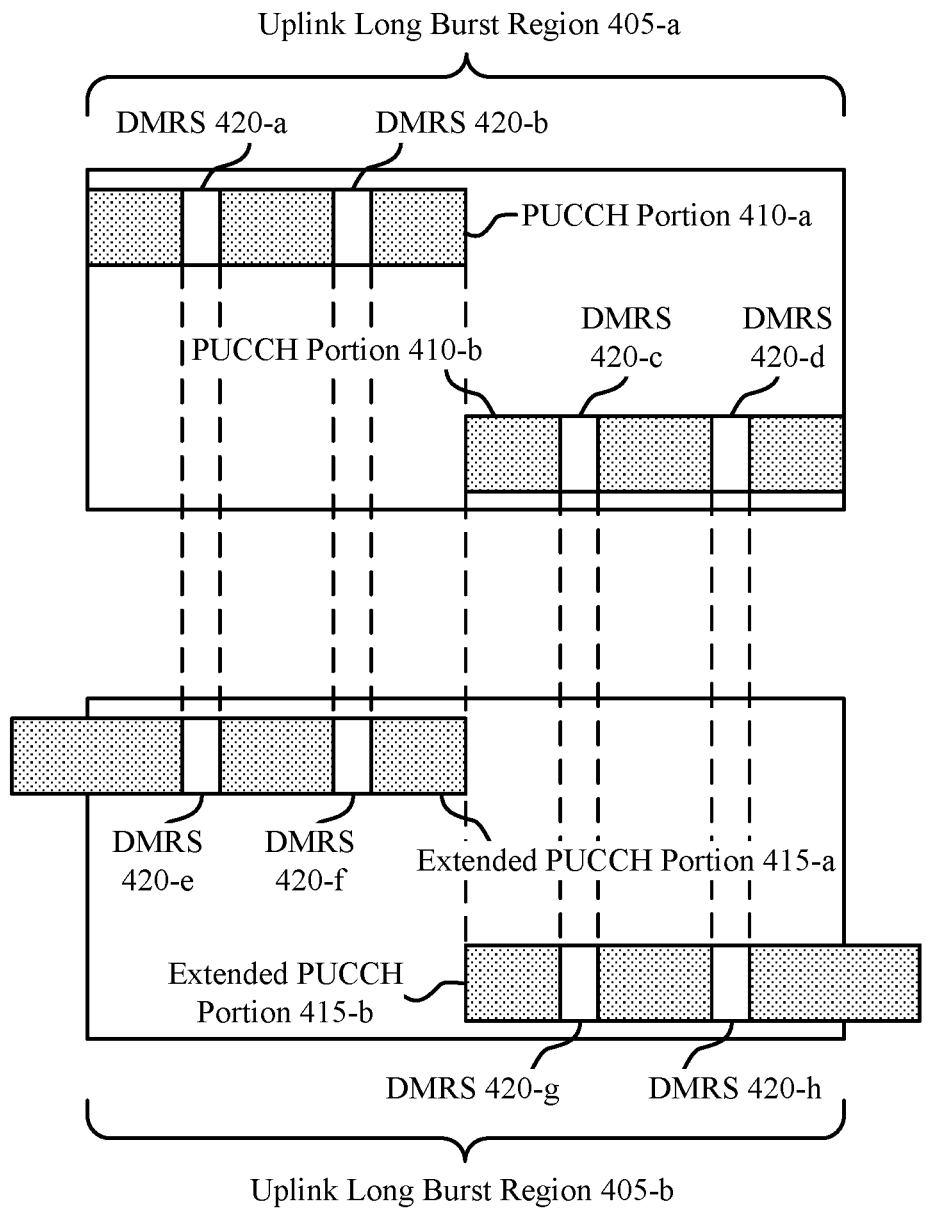
FIG. 4 illustrates an example of physical uplink control channel (PUCCH) configurations that supports uplink control channel configurations for wireless communications in accordance with aspects of the present disclosure.

FIG. 4 illustrates an example of PUCCH configurations 400 that supports uplink control channel configurations for wireless communications in accordance with various aspects of the present disclosure. PUCCH configurations 400 may include uplink long burst regions 405, which may be portions of TTIs or aggregations of TTIs. Each uplink long burst region 405 may include PUCCH portions 410 or extended PUCCH portions 415.

In some cases, a base station 105, which may use a same uplink payload size (e.g., with a same uplink long burst region 405 duration), may receive uplink information in PUCCH portions 410 or extended PUCCH portions 415. For a same payload size, the base station 105 may configure frequency hopping at a fixed symbol index. For example, uplink long burst region 405-a may perform frequency hopping from first PUCCH portion 410-a to second PUCCH portion 410-b. Similarly, uplink long burst region 405-b may perform frequency hopping from first extended PUCCH portion 415-a to second extended PUCCH portion 415-b at the same symbol index within the TTI. This may allow for a simplified design for configuration and reception at the base station 105.

For a same payload size, the base station 105 may additionally configure demodulation reference signal (DMRS) 420 transmissions for fixed symbol indices. For example, in PUCCH portions 410, a UE 115 may be configured to transmit DMRS 420-a, 420-b, 420-c, and 420-d. Similarly, in extended PUCCH portions 415, a UE 115 may be configured to transmit DMRS 420-e, 420-f, 420-g, and 420-h, which may be transmitted at the same symbols within the TTI as the DMRS for PUCCH portions 410. Instead of shifting the DMRS of frequency hopping locations, the extended PUCCH portions 415 may just add additional symbols for data transmission to the beginning, the end, or both of PUCCH portions 410. In some cases, the duration may contain only a subset of DMRS and data symbols compared to other longer duration configurations (e.g., 4 symbol duration). DMRS symbols may be excluded in such cases, but each frequency location, for example, may contain at least DMRS symbols for channel estimation. In some cases, a different size payload and a different uplink long burst region 405 duration may correspond to different hopping locations or DMRS 420 transmission timing.

Figure 5:
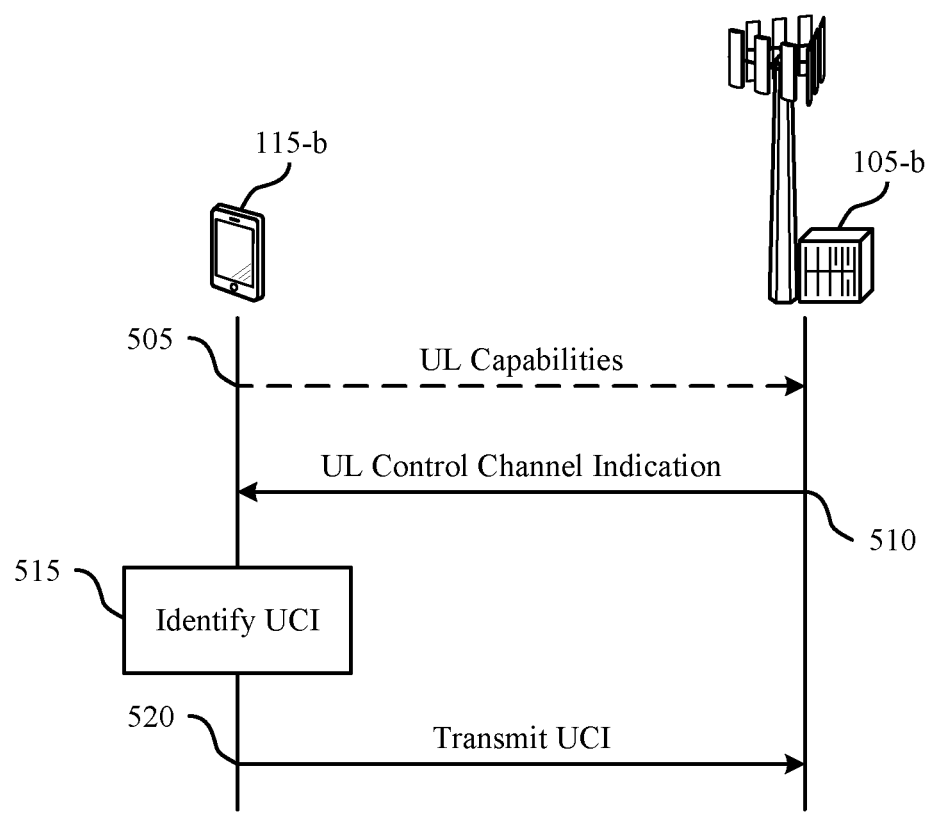
FIGS. 5 and 6 illustrate examples of process flows that supports uplink control channel configurations for wireless communications in accordance with aspects of the present disclosure.

FIG. 5 illustrates an example of a process flow 500 that supports uplink control channel configurations for wireless communications in accordance with various aspects of the present disclosure. Process flow 500 may include UE 115-*b* and base station 105-*b*, which may be examples of a UE 115 and a base station 105 as described with reference to FIGS. 1 and 2.

At 505, UE 115-*b* may transmit an indication of one or more UE capabilities for UE 115-*b*. For example, the one or more UE capabilities may include the ability of the UE 115-*b* to decode information transmitted in the PCFICH or the PDCCH. Base station 105-*b* may receive the indication of the UE capabilities, and may determine an uplink control channel configuration for UE 115-*b* based on the UE capabilities.

At 510, base station 105-*b* may transmit an indication of the uplink control channel configuration to UE 115-*b*. In some cases, base station 105-*b* may transmit the indication in a physical layer message (e.g., in the PCFICH or the PDCCH). In other cases, base station 105-*b* may transmit the indication in an SIB or RRC signaling.

The indication may or may not be a direct indication of a starting position, ending position, or duration of an uplink portion. The indication may include at least one of an index for the start of the uplink portion, an index the end of the first uplink portion, or a duration of the first uplink portion. In some examples, the indication includes at least one of a dynamic indication or a semi-static indication for uplink transmissions in the TTI. A dynamic indication may include a start of the first uplink portion is based at least in part on a size of the downlink portion. A dynamic indication may be received on a PDCCH and/or the first uplink portion extends into the second uplink portion in the TTI. A semi-static indication may be received with at least one of a system information message or a radio resource control message. The indication may be a dynamic indication of the uplink configuration for a first TTI and a semi-static indication of the uplink configuration for a second TTI. Alternatively, the indication may be of a PDCCH region and/or a ULSB region, and an additional uplink region or portion may be derived.

At 515, UE 115-*b* may identify UCI for transmission during a first uplink portion of a TTI. The TTI may include a downlink portion, the first uplink portion, and a second uplink portion shorter than the first uplink portion. The UCI may have an associated payload size.

At 520, UE 115-*b* may transmit the UCI to base station 105-*b* during the first uplink portion or the second uplink portion of the TTI on an uplink control channel according to the uplink control channel configuration. In some cases, UE 115-*b* may determine and implement a hopping pattern for the UCI transmission based on a payload size of the UCI. In some cases, at least a portion of the uplink control channel may overlap a portion of a gap interval between the downlink portion and the first uplink portion of the TTI.

Figure 6:
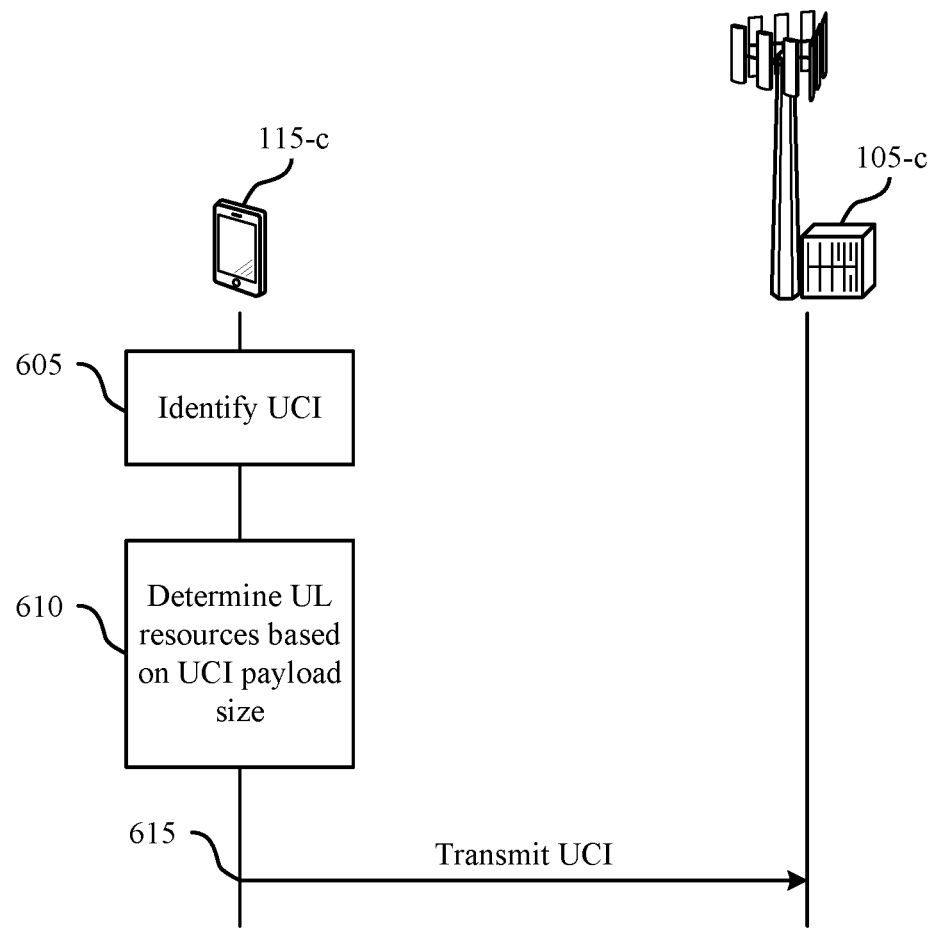

FIG. 6 illustrates an example of a process flow 600 that supports uplink control channel configurations for wireless communications in accordance with various aspects of the present disclosure. Process flow 600 may include UE 115-*c* and base station 105-*c*, which may be examples of a UE 115 and a base station 105 as described with reference to FIGS. 1 and 2.

At 605, UE 115-*c* may identify UCI for transmission to base station 105-*c*. At 610, UE 115-*c* may determine a set of uplink resources for transmission of the UCI. In some cases, UE 115-*c* may determine the set of uplink resources based on the payload size of the UCI. In some cases, the set of uplink resources may include PUCCH and PUSCH resources. UE 115-*c* may determine the set of uplink resources by comparing the payload size of the UCI to one or more payload thresholds.

At 615, UE 115-*c* may transmit the UCI to base station 105-*c* using the set of uplink resources. In some cases, the transmission may be based on a channel configuration previously received from base station 105-*c*.

Figure 7:
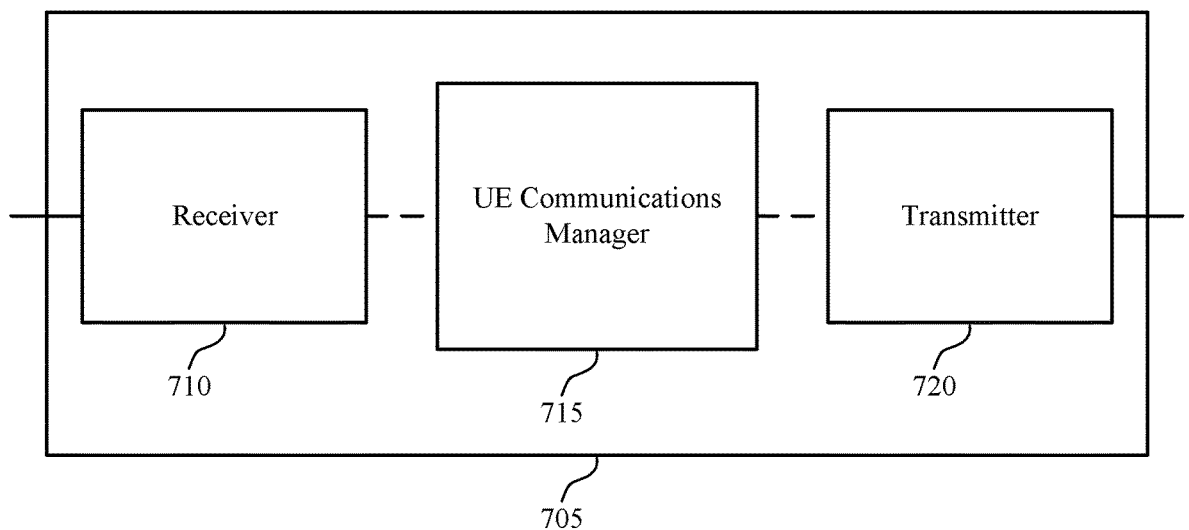
FIGS. 7 through 9 show block diagrams of a device that supports uplink control channel configurations for wireless communications in accordance with aspects of the present disclosure.

FIG. 7 shows a block diagram 700 of a wireless device 705 that supports uplink control channel configurations for wireless communications in accordance with aspects of the present disclosure. Wireless device 705 may be an example of aspects of a UE 115 as described with reference to FIGS. 1, 2, 5, and 6. Wireless device 705 may include receiver 710, UE communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to uplink control channel configurations for wireless communications, etc.). Information may be passed on to other components of the device. The receiver 710 may be an example of aspects of the transceiver 1035 described with reference to FIG. 10. The receiver 710 may utilize a single antenna or a set of antennas.

UE communications manager 715 may be an example of aspects of the UE communications manager 1015 described with reference to FIG. 10. UE communications manager 715 and/or at least some of its various sub-components may be implemented in hardware, software executed by a processor, firmware, or any combination thereof. If implemented in software executed by a processor, the functions of the UE communications manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE communications manager 715 and/or at least some of its various sub-components may be physically located at various positions, including being distributed such that portions of functions are implemented at different physical locations by one or more physical devices. In some examples, UE communications manager 715 and/or at least some of its various sub-components may be a separate and distinct component in accordance with various aspects of the present disclosure. In other examples, UE communications manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 715 may receive an indication of an uplink control channel configuration and identify UCI for transmission during a first uplink portion of a TTI that has a downlink portion, the first uplink portion, and a second uplink portion, where the first uplink portion has a longer duration than the second uplink portion. The UE communications manager 715 may also identify UCI for transmission and determine a set of uplink resources for transmission of the UCI based on a payload size of the UCI.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may utilize a single antenna or a set of antennas.

Transmitter 720 may transmit the UCI during the first uplink portion or the second uplink portion of the TTI according to the uplink control channel configuration and transmit the UCI using the set of uplink resources. In some cases, transmitting the UCI includes: transmitting a first portion of the UCI during the first uplink portion and a second portion during the second uplink portion of the TTI.

Figure 8:
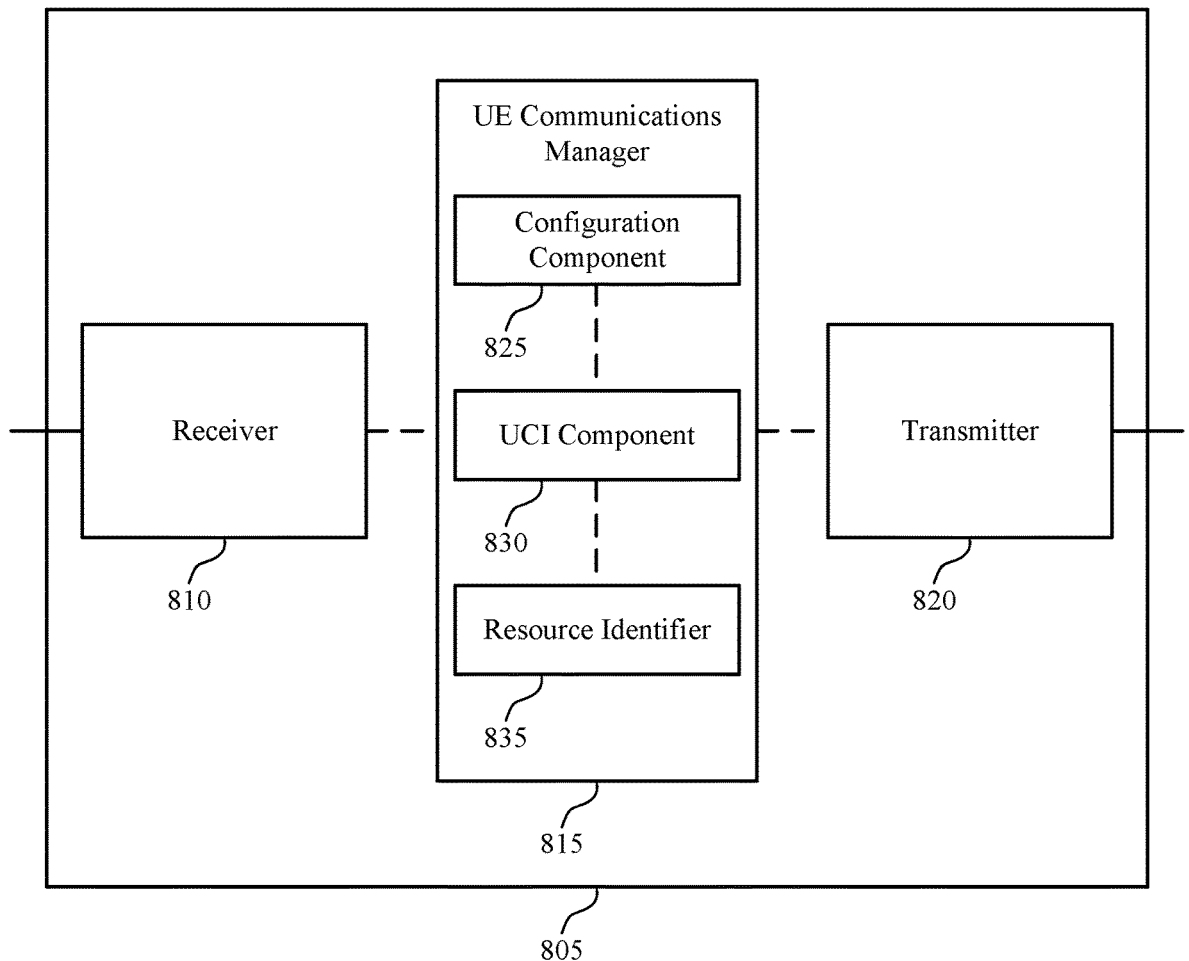

FIG. 8 shows a block diagram 800 of a wireless device 805 that supports uplink control channel configurations for wireless communications in accordance with aspects of the present disclosure. Wireless device 805 may be an example of aspects of a wireless device 705 or a UE 115 as described with reference to FIGS. 1, 2, and 5 through 7. Wireless device 805 may include receiver 810, UE communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to uplink control channel configurations for wireless communications, etc.). Information may be passed on to other components of the device. The receiver 810 may be an example of aspects of the transceiver 1035 described with reference to FIG. 10. The receiver 810 may utilize a single antenna or a set of antennas.

UE communications manager 815 may be an example of aspects of the UE communications manager 1015 described with reference to FIG. 10. UE communications manager 815 may also include configuration component 825, UCI component 830, and resource identifier 835.

Configuration component 825 may receive an indication of an uplink control channel configuration. In some cases, the uplink control channel configuration is based on a number of symbols of the downlink portion of the TTI occupied by the PDCCH or a number of symbols of the second uplink portion of the TTI, or both. In some examples, the indication is received via a SIB or RRC signaling.

UCI component 830 may identify UCI for transmission during a first uplink portion of a TTI that has a downlink portion, the first uplink portion, and a second uplink portion, where the first uplink portion has a longer duration than the second uplink portion and identify UCI for transmission.

Resource identifier 835 may determine a set of uplink resources for transmission of the UCI based on a payload size of the UCI. In some cases, the set of uplink resources includes at least one of a set of PUCCH resources and a set of PUSCH resources. In some examples, the set of uplink resources includes a set of channel structures or a set of coding schemes, or both. In some aspects, the set of resources includes an uplink control channel having a first duration, an uplink control channel having a second duration longer than the first duration, an uplink shared channel having a third duration, or an uplink shared channel having a fourth duration that is longer than the third duration in a system that supports uplink TTIs of the first, second, third, and fourth durations.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
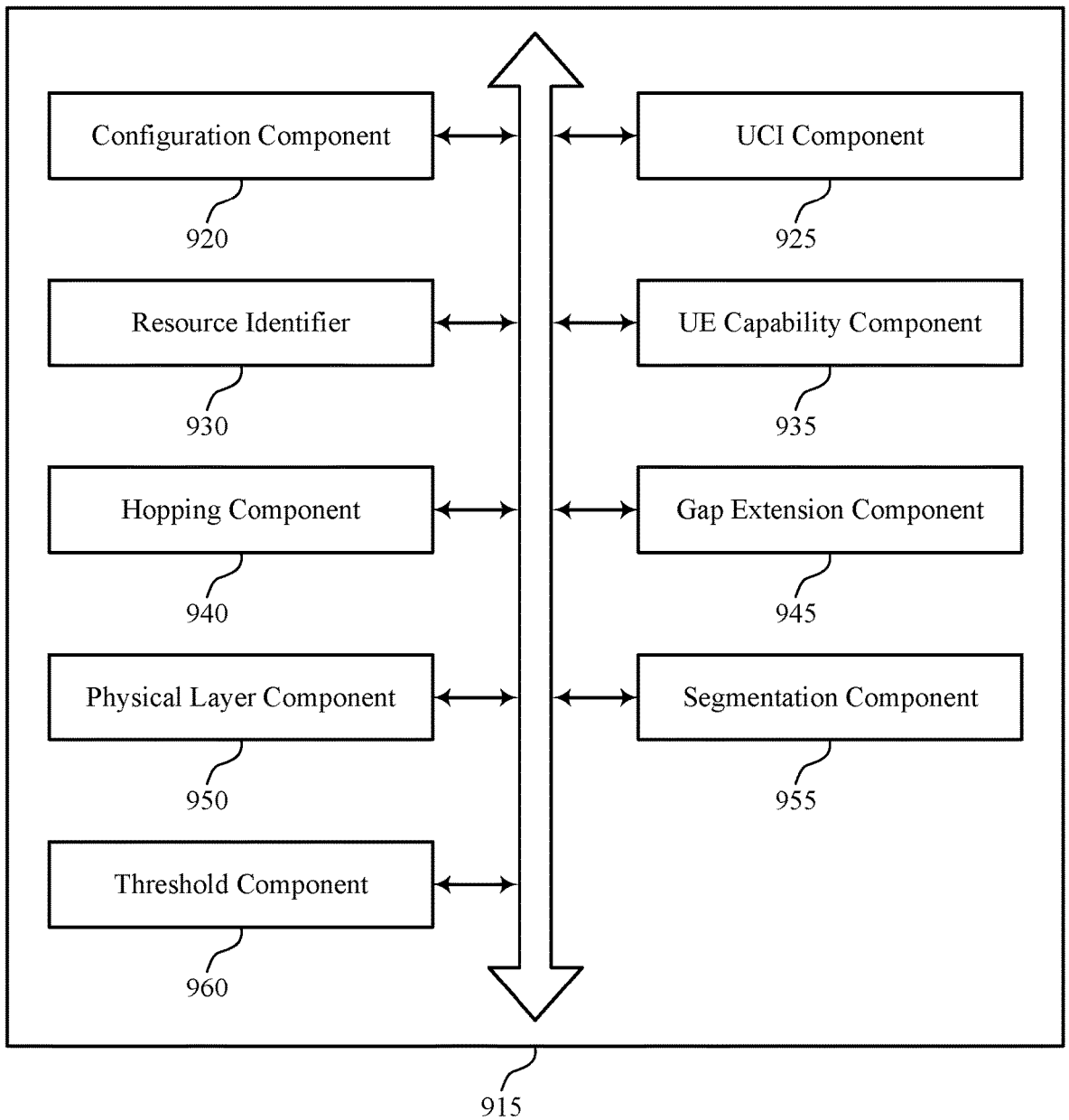

FIG. 9 shows a block diagram 900 of a UE communications manager 915 that supports uplink control channel configurations for wireless communications in accordance with aspects of the present disclosure. The UE communications manager 915 may be an example of aspects of a UE communications manager 715, a UE communications manager 815, or a UE communications manager 1015 described with reference to FIGS. 7, 8, and 10. The UE communications manager 915 may include configuration component 920, UCI component 925, resource identifier 930, UE capability component 935, hopping component 940, gap extension component 945, physical layer component 950, segmentation component 955, and threshold component 960. Each of these modules may communicate, directly or indirectly, with one another (e.g., via one or more buses).

Configuration component 920 may receive an indication of an uplink control channel configuration. In some cases, the uplink control channel configuration is based on a number of symbols of the downlink portion of the TTI occupied by the PDCCH or a number of symbols of the second uplink portion of the TTI, or both. In some cases, the indication is received via a SIB or RRC signaling.

UCI component 925 may identify UCI for transmission during a first uplink portion of a TTI that has a downlink portion, the first uplink portion, and a second uplink portion, where the first uplink portion has a longer duration than the second uplink portion and identify UCI for transmission.

Resource identifier 930 may determine a set of uplink resources for transmission of the UCI based on a payload size of the UCI. In some cases, the set of uplink resources includes at least one of a set of PUCCH resources and a set of PUSCH resources. In some examples, the set of uplink resources includes a set of channel structures or a set of coding schemes, or both. In some aspects, the set of resources includes an uplink control channel having a first duration, an uplink control channel having a second duration longer than the first duration, an uplink shared channel having a third duration, or an uplink shared channel having a fourth duration that is longer than the third duration in a system that supports uplink TTIs of the first, second, third, and fourth durations.

UE capability component 935 may transmit an indication of UE capability, where the indication of the uplink control channel configuration is based on the UE capability.

Hopping component 940 may determine a hopping pattern for transmission of the UCI within the first uplink portion, the hopping pattern selected from a set of hopping patterns based on a payload size of the UCI. Hopping component 940 may determine a symbol index for a DMRS for the hopping pattern, where the symbol index includes a same value for each hopping pattern of the set of hopping patterns.

Gap extension component 945 may extend at least a portion of an uplink control channel having the uplink control channel configuration to overlap at least a portion of a gap interval between the downlink portion and the first uplink portion of the TTI. In some cases, the uplink control channel configuration includes a first code for multiplexing UEs during the gap interval and a second code for multiplexing UEs, or for multiplexing transmissions (e.g., from a same UE), during the first uplink portion of the TTI.

Physical layer component 950 may receive the indication via a physical layer message. In some cases, the physical layer message includes at least one of a PCFICH or a PDCCH. In some examples, the indication indicates a number of orthogonal frequency division multiplexing (OFDM) symbols of the uplink control channel configuration, a number of OFDM symbols of the first uplink portion of the TTI, a number of OFDM symbols of the second uplink portion of the TTI, or a number of OFDM symbols of the downlink portion of the TTI, or any combination thereof. In some aspects, the physical layer message includes a UE-specific PDCCH message. In some instances, the physical layer message includes a common PDCCH message.

Segmentation component 955 may segment the UCI using a set of polar codes, where transmitting the UCI is based on the segmenting.

Threshold component 960 may compare the payload size of the UCI to one or more payload thresholds, where the set of uplink resources is determined based on the comparing. In some cases, comparing the payload size includes: determining that the payload size is within a range defined by a first payload threshold and a second payload threshold.

Figure 10:
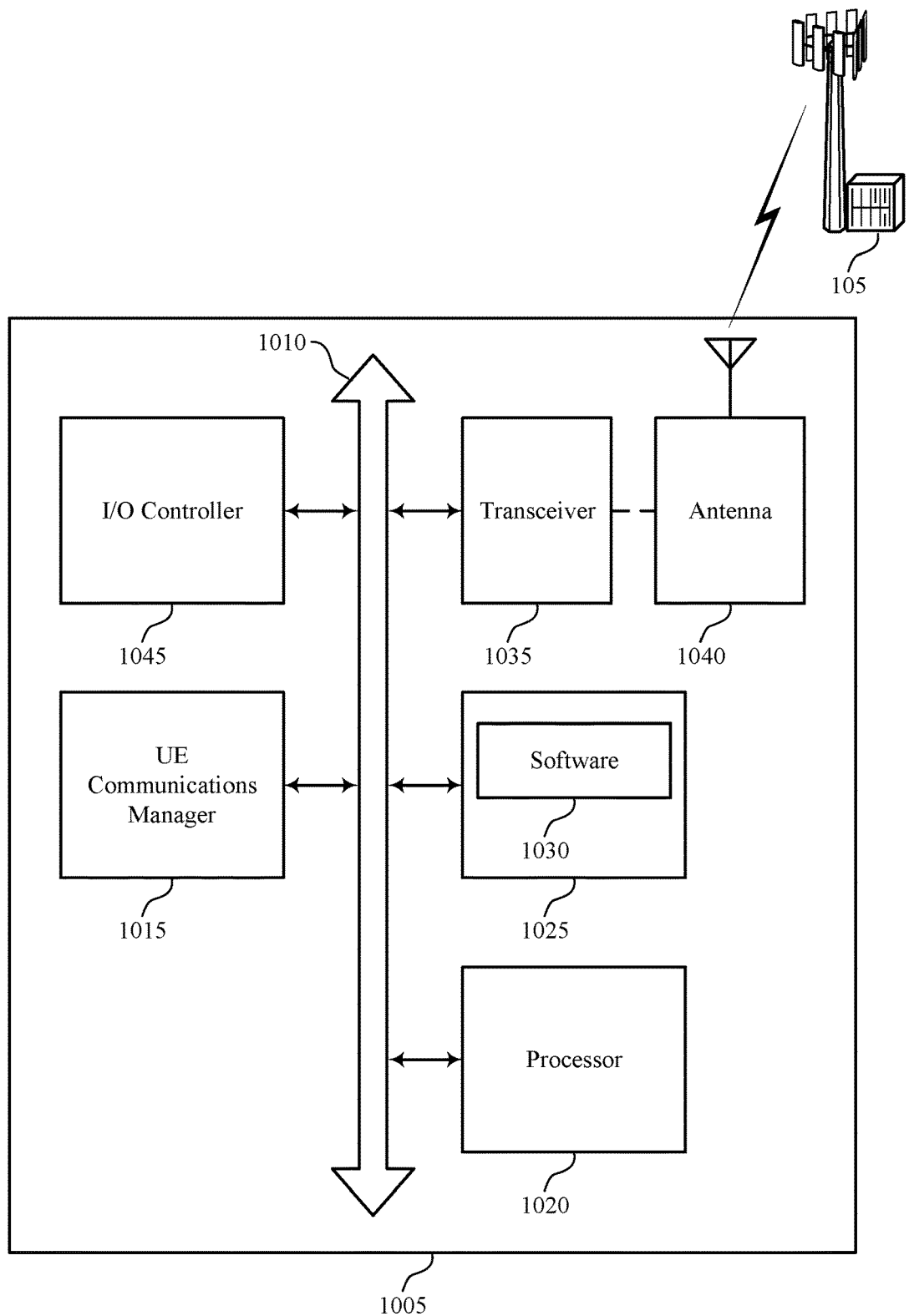
FIG. 10 illustrates a block diagram of a system including a user equipment (UE) that supports uplink control channel configurations for wireless communications in accordance with aspects of the present disclosure.

FIG. 10 shows a diagram of a system 1000 including a device 1005 that supports uplink control channel configurations for wireless communications in accordance with aspects of the present disclosure. Device 1005 may be an example of or include the components of wireless device 705, wireless device 805, or a UE 115 as described above, e.g., with reference to FIGS. 1, 2, and 5 through 8. Device 1005 may include components for bi-directional voice and data communications including components for transmitting and receiving communications, including UE communications manager 1015, processor 1020, memory 1025, software 1030, transceiver 1035, antenna 1040, and I/O controller 1045. These components may be in electronic communication via one or more busses (e.g., bus 1010). Device 1005 may communicate wirelessly with one or more base stations 105.

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting uplink control channel configurations for wireless communications).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware and/or software operation such as the interaction with peripheral components or devices.

Software 1030 may include code to implement aspects of the present disclosure, including code to support uplink control channel configurations for wireless communications. Software 1030 may be stored in a non-transitory computer-readable medium such as system memory or other memory. In some examples, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some aspects, the wireless device may include a single antenna 1040. However, in some cases the device may have more than one antenna 1040, which may be capable of concurrently transmitting or receiving multiple wireless transmissions.

I/O controller 1045 may manage input and output signals for device 1005. I/O controller 1045 may also manage peripherals not integrated into device 1005. In some cases, I/O controller 1045 may represent a physical connection or port to an external peripheral. In some examples, I/O controller 1045 may utilize an operating system such as iOS®, ANDROID®, MS-DOS®, MS-WINDOWS®, OS/2®, UNIX®, LINUX®, or another known operating system. In other cases, I/O controller 1045 may represent or interact with a modem, a keyboard, a mouse, a touchscreen, or a similar device. In some aspects, I/O controller 1045 may be implemented as part of a processor. In some instances, a user may interact with device 1005 via I/O controller 1045 or via hardware components controlled by I/O controller 1045.

Figure 11:
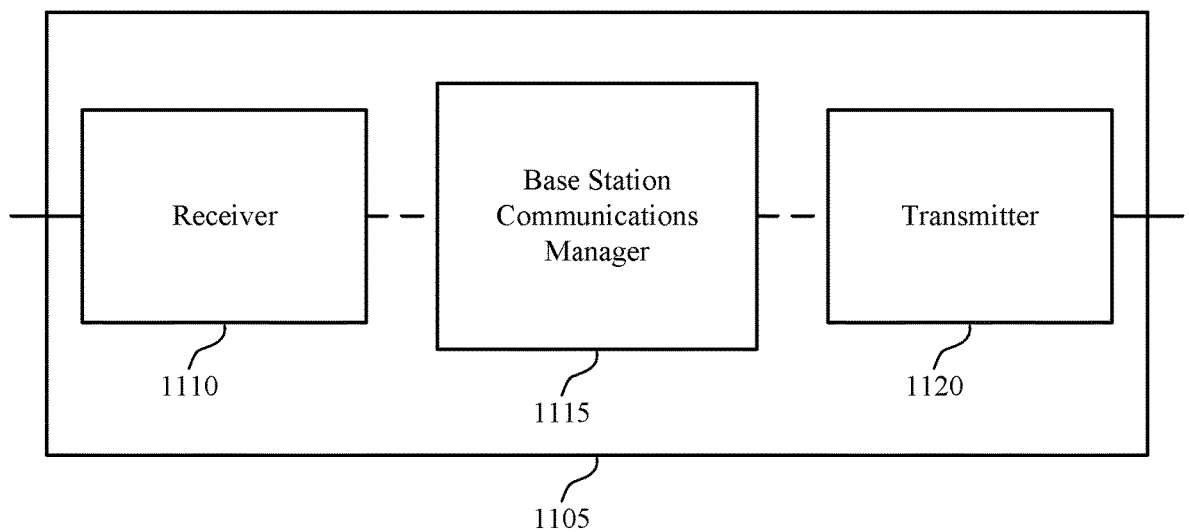
FIGS. 11 through 13 show block diagrams of a device that supports uplink control channel configurations for wireless communications in accordance with aspects of the present disclosure.

FIG. 11 shows a block diagram 1100 of a wireless device 1105 that supports uplink control channel configurations for wireless communications in accordance with aspects of the present disclosure. Wireless device 1105 may be an example of aspects of a base station 105 as described with reference to FIGS. 1, 2, 5, and 6. Wireless device 1105 may include receiver 1110, base station communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to uplink control channel configurations for wireless communications, etc.). Information may be passed on to other components of the device. The receiver 1110 may be an example of aspects of the transceiver 1435 described with reference to FIG. 14. The receiver 1110 may utilize a single antenna or a set of antennas.

Base station communications manager 1115 may be an example of aspects of the base station communications manager 1415 described with reference to FIG. 14. Base station communications manager 1115 and/or at least some of its various sub-components may be implemented in hardware, software executed by a processor, firmware, or any combination thereof. If implemented in software executed by a processor, the functions of the base station communications manager 1115 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 1115 and/or at least some of its various sub-components may be physically located at various positions, including being distributed such that portions of functions are implemented at different physical locations by one or more physical devices. In some examples, base station communications manager 1115 and/or at least some of its various sub-components may be a separate and distinct component in accordance with various aspects of the present disclosure. In other examples, base station communications manager 1115 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1115 may transmit an indication of an uplink control channel configuration and receive UCI according to the uplink control channel configuration during a first uplink portion of a TTI that has a downlink portion, the first uplink portion, and a second uplink portion, where the first uplink portion has a longer duration than the second uplink portion. The base station communications manager 1115 may also identify a set of resources for reception of UCI from a UE, where the set of resources are determined based on a payload size of the UCI and receive, over the set of resources, the UCI from the UE.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1435 described with reference to FIG. 14. The transmitter 1120 may utilize a single antenna or a set of antennas.

Figure 12:
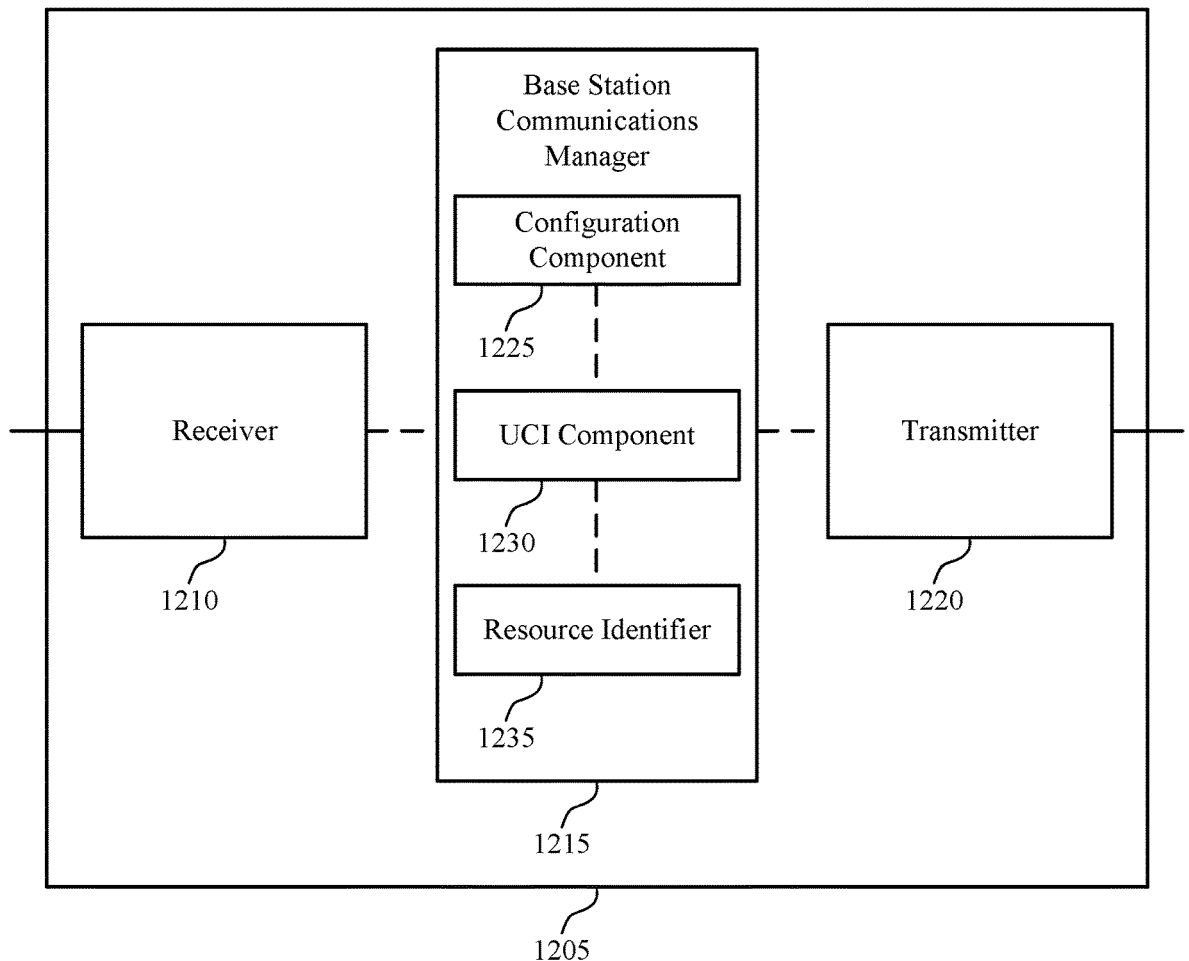

FIG. 12 shows a block diagram 1200 of a wireless device 1205 that supports uplink control channel configurations for wireless communications in accordance with aspects of the present disclosure. Wireless device 1205 may be an example of aspects of a wireless device 1105 or a base station 105 as described with reference to FIGS. 1, 2, 5, 6, and 11. Wireless device 1205 may include receiver 1210, base station communications manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to uplink control channel configurations for wireless communications, etc.). Information may be passed on to other components of the device. The receiver 1210 may be an example of aspects of the transceiver 1435 described with reference to FIG. 14. The receiver 1210 may utilize a single antenna or a set of antennas.

Base station communications manager 1215 may be an example of aspects of the base station communications manager 1415 described with reference to FIG. 14. Base station communications manager 1215 may also include configuration component 1225, UCI component 1230, and resource identifier 1235.

Configuration component 1225 may transmit an indication of an uplink control channel configuration. In some cases, the uplink control channel configuration is based on a number of symbols of the downlink portion of the TTI occupied by the PDCCH or a number of symbols of the second uplink portion of the TTI, or both. In some cases, the indication is transmitted via a SIB or RRC signaling.

UCI component 1230 may receive UCI according to the uplink control channel configuration during a first uplink portion of a TTI that has a downlink portion, the first uplink portion, and a second uplink portion, where the first uplink portion has a longer duration than the second uplink portion and receive, over the set of resources, the UCI from the UE. In some cases, receiving the UCI includes: receiving at least a first portion of the UCI during the first uplink portion and a second portion during the second uplink portion of the TTI. In some examples, receiving the UCI includes: receiving multiple segments of the UCI using a set of polar codes.

Resource identifier 1235 may identify a set of resources for reception of UCI from a UE, where the set of resources are determined based on a payload size of the UCI. In some cases, the set of resources includes at least one of a set of PUCCH resources and a set of PUSCH resources. In some examples, the set of resources includes a set of channel structures or a set of coding schemes, or both. In some aspects, the set of resources includes an uplink control channel having a first duration, an uplink control channel having a second duration longer than the first duration, an uplink shared channel having a third duration, or an uplink shared channel having a fourth duration that is longer than the third duration in a system that supports uplink TTIs of the first, second, third, and fourth durations.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may utilize a single antenna or a set of antennas.

Figure 13:
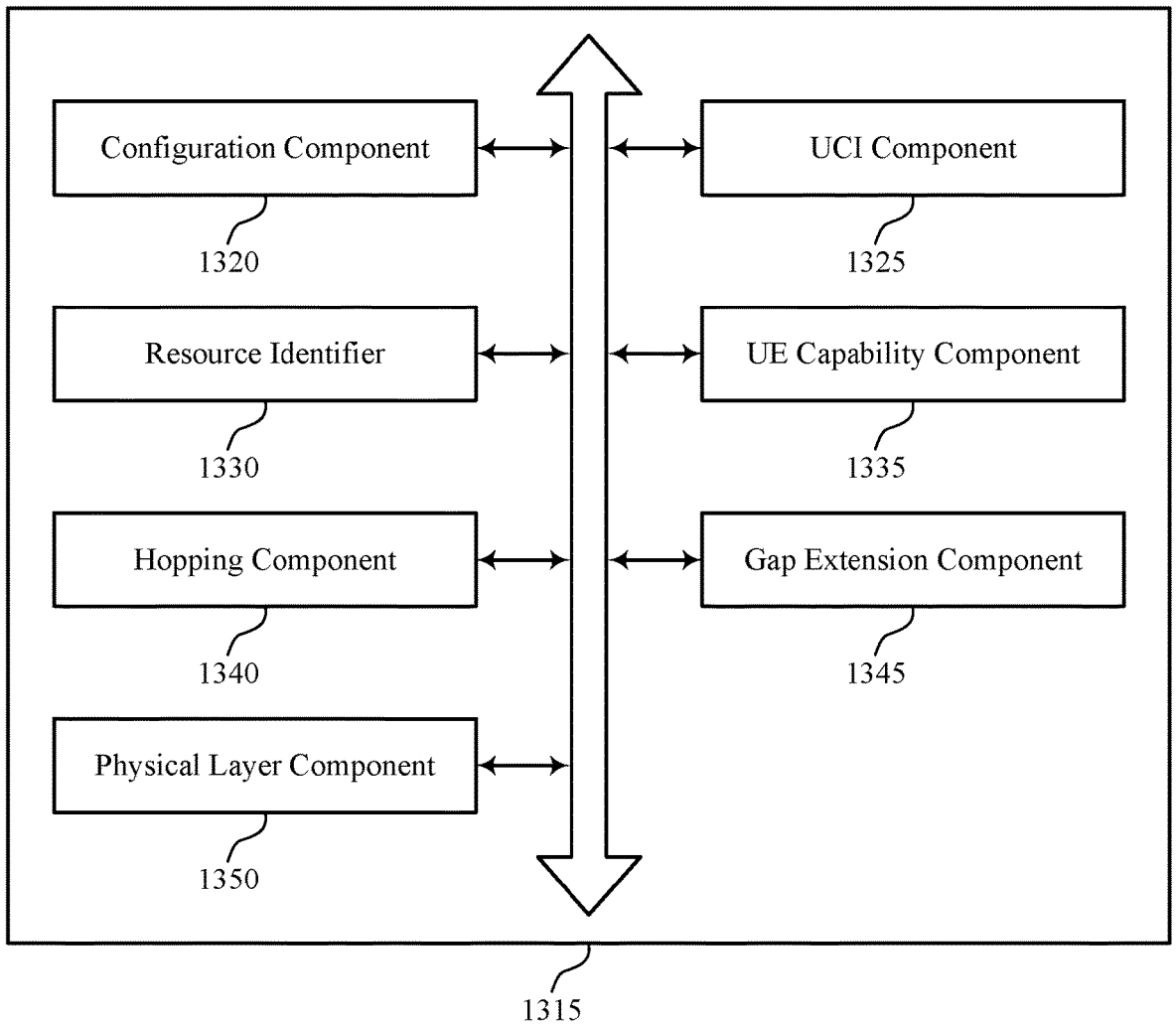

FIG. 13 shows a block diagram 1300 of a base station communications manager 1315 that supports uplink control channel configurations for wireless communications in accordance with aspects of the present disclosure. The base station communications manager 1315 may be an example of aspects of a base station communications manager 1415 described with reference to FIGS. 11, 12, and 14. The base station communications manager 1315 may include configuration component 1320, UCI component 1325, resource identifier 1330, UE capability component 1335, hopping component 1340, gap extension component 1345, and physical layer component 1350. Each of these modules may communicate, directly or indirectly, with one another (e.g., via one or more buses).

Configuration component 1320 may transmit an indication of an uplink control channel configuration. In some cases, the uplink control channel configuration is based on a number of symbols of the downlink portion of the TTI occupied by the PDCCH or a number of symbols of the second uplink portion of the TTI, or both. In some examples, the indication is transmitted via a SIB or RRC signaling.

UCI component 1325 may receive UCI according to the uplink control channel configuration during a first uplink portion of a TTI that has a downlink portion, the first uplink portion, and a second uplink portion, where the first uplink portion has a longer duration than the second uplink portion and receive, over the set of resources, the UCI from the UE. In some cases, receiving the UCI includes: receiving at least a first portion of the UCI during the first uplink portion and a second portion during the second uplink portion of the TTI. In some examples, receiving the UCI includes: receiving multiple segments of the UCI using a set of polar codes.

Resource identifier 1330 may identify a set of resources for reception of UCI from a UE, where the set of resources is determined based on a payload size of the UCI. In some cases, the set of resources includes at least one of a set of PUCCH resources and a set of PUSCH resources. In some aspects, the set of resources includes a set of channel structures or a set of coding schemes, or both. In some examples, the set of resources includes an uplink control channel having a first duration, an uplink control channel having a second duration longer than the first duration, an uplink shared channel having a third duration, or an uplink shared channel having a fourth duration that is longer than the third duration in a system that supports uplink TTIs of the first, second, third, and fourth durations.

UE capability component 1335 may receive an indication of a UE capability, where the indication of the uplink control channel configuration is based on the UE capability.

Hopping component 1340 may determine a hopping pattern for transmission of the UCI within the first uplink portion, the hopping pattern selected from a set of hopping patterns based on a payload size of the UCI and determine a symbol index for a DMRS for the hopping pattern, where the symbol index is includes a same value for each hopping pattern of the set of hopping patterns.

Gap extension component 1345 may extend at least a portion of an uplink control channel having the uplink control channel configuration to overlap at least a portion of a gap interval between the downlink portion and the first uplink portion of the TTI. In some cases, the uplink control channel configuration includes a first code for multiplexing UEs during the gap interval and a second code for multiplexing UEs during the first uplink portion of the TTI.

Physical layer component 1350 may transmit the indication via a physical layer message. In some cases, the physical layer message includes at least one of a PCFICH or a PDCCH. In some examples, the indication indicates a number of OFDM symbols of the uplink control channel configuration, a number of OFDM symbols of the first uplink portion of the TTI, a number of OFDM symbols of the second uplink portion of the TTI, or a number of OFDM symbols of the downlink portion of the TTI, or any combination thereof. In some aspects, the physical layer message includes a UE-specific PDCCH message.

Figure 14:
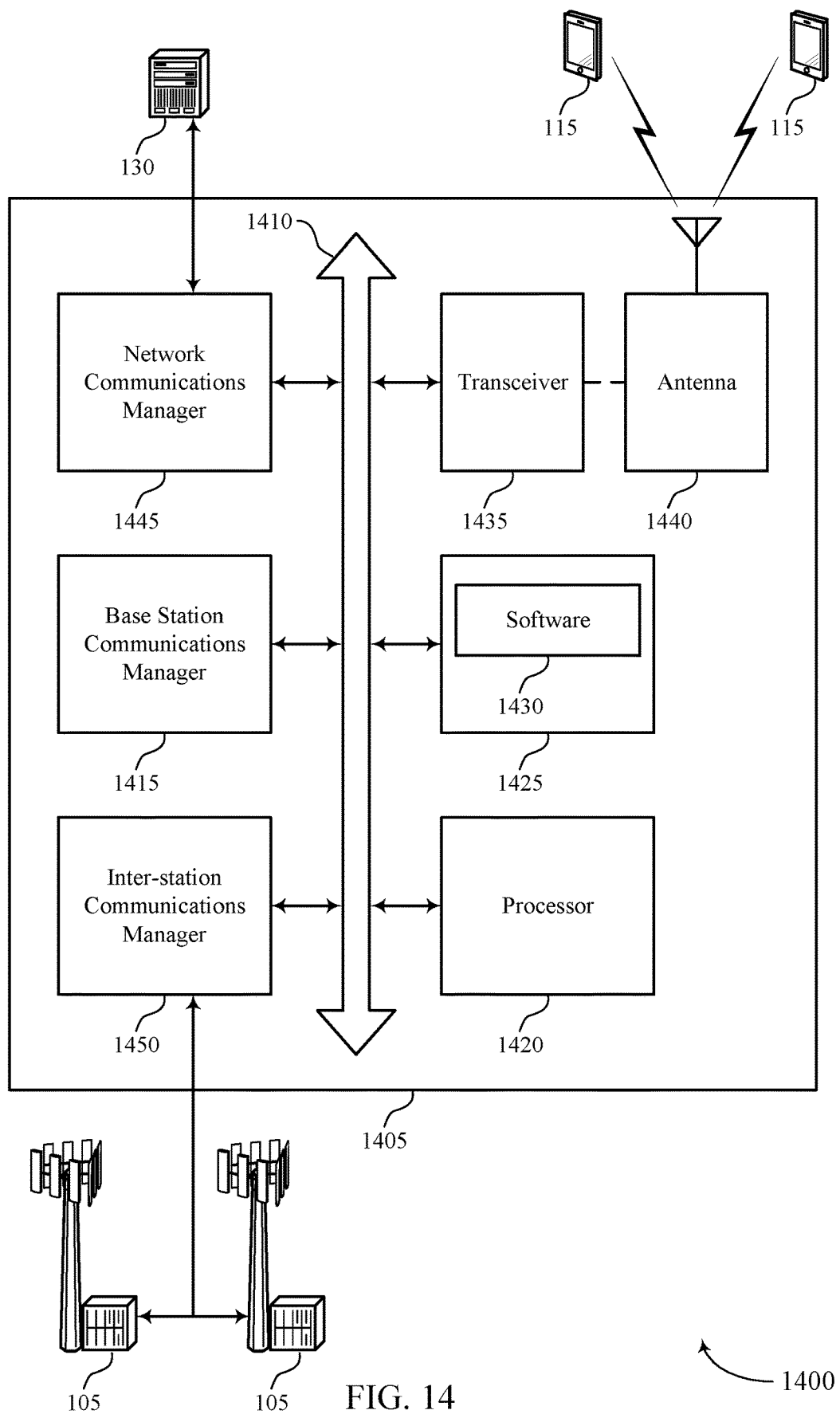
FIG. 14 illustrates a block diagram of a system including a base station that supports uplink control channel configurations for wireless communications in accordance with aspects of the present disclosure.

FIG. 14 shows a diagram of a system 1400 including a device 1405 that supports uplink control channel configurations for wireless communications in accordance with aspects of the present disclosure. Device 1405 may be an example of or include the components of base station 105 as described above, e.g., with reference to FIGS. 1, 2, 5, 6, 11, and 12. Device 1405 may include components for bi-directional voice and data communications including components for transmitting and receiving communications, including base station communications manager 1415, processor 1420, memory 1425, software 1430, transceiver 1435, antenna 1440, network communications manager 1445, and inter-station communications manager 1450. These components may be in electronic communication via one or more busses (e.g., bus 1410). Device 1405 may communicate wirelessly with one or more UEs 115.

Processor 1420 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting uplink control channel configurations for wireless communications).

Memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS which may control basic hardware and/or software operation such as the interaction with peripheral components or devices.

Software 1430 may include code to implement aspects of the present disclosure, including code to support uplink control channel configurations for wireless communications. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas.

In some cases, the wireless device may include a single antenna 1440. However, in some cases the device may have more than one antenna 1440, which may be capable of concurrently transmitting or receiving multiple wireless transmissions.

Network communications manager 1445 may manage communications with the core network (e.g., via one or more wired backhaul links). For example, the network communications manager 1445 may manage the transfer of data communications for client devices, such as one or more UEs 115.

Inter-station communications manager 1450 may manage communications with other base station 105, and may include a controller or scheduler for controlling communications with UEs 115 in cooperation with other base stations 105. For example, the inter-station communications manager 1450 may coordinate scheduling for transmissions to UEs 115 for various interference mitigation techniques such as beamforming or joint transmission. In some examples, inter-station communications manager 1450 may provide an X2 interface within an LTE/LTE-A wireless communication network technology to provide communication between base stations 105.

Figure 15:
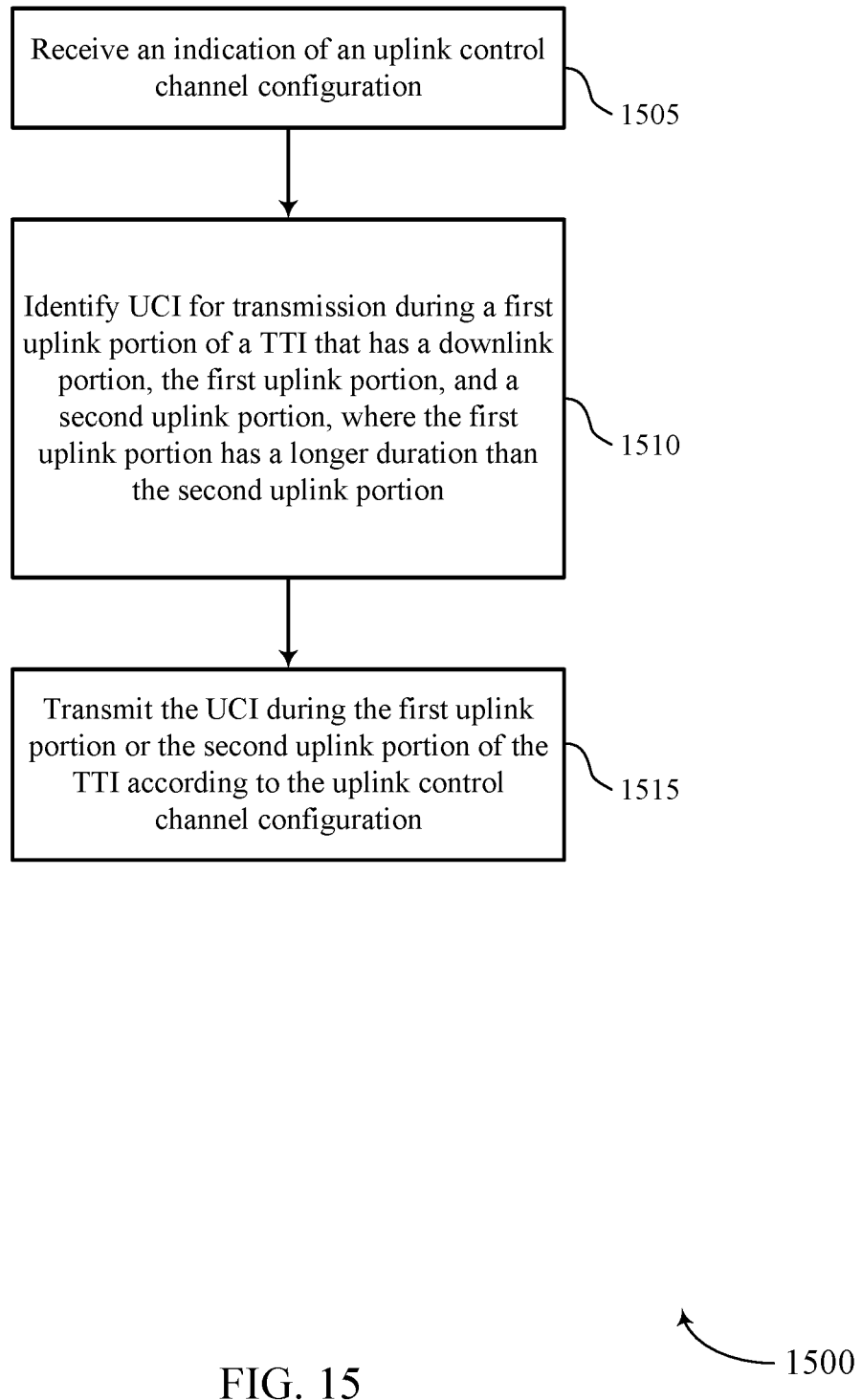
FIGS. 15 through 20 illustrate methods for uplink control channel configurations for wireless communications in accordance with aspects of the present disclosure.

FIG. 15 shows a flowchart illustrating a method 1500 for uplink control channel configurations for wireless communications in accordance with aspects of the present disclosure. The operations of method 1500 may be implemented by a UE 115 or its components as described herein. For example, the operations of method 1500 may be performed by a UE communications manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At block 1505 the UE 115 may receive an indication of an uplink control channel configuration. The operations of block 1505 may be performed according to the methods described with reference to FIGS. 1 through 6. In certain examples, aspects of the operations of block 1505 may be performed by a configuration component as described with reference to FIGS. 7 through 10.

At block 1510 the UE 115 may identify UCI for transmission during a first uplink portion of a TTI that has a downlink portion, the first uplink portion, and a second uplink portion, where the first uplink portion has a longer duration than the second uplink portion. The operations of block 1510 may be performed according to the methods described with reference to FIGS. 1 through 6. In certain examples, aspects of the operations of block 1510 may be performed by a UCI component as described with reference to FIGS. 7 through 10.

At block 1515 the UE 115 may transmit the UCI during the first uplink portion or the second uplink portion of the TTI according to the uplink control channel configuration. The operations of block 1515 may be performed according to the methods described with reference to FIGS. 1 through 6. In certain examples, aspects of the operations of block 1515 may be performed by a transmitter as described with reference to FIGS. 7 through 10.

Figure 16:
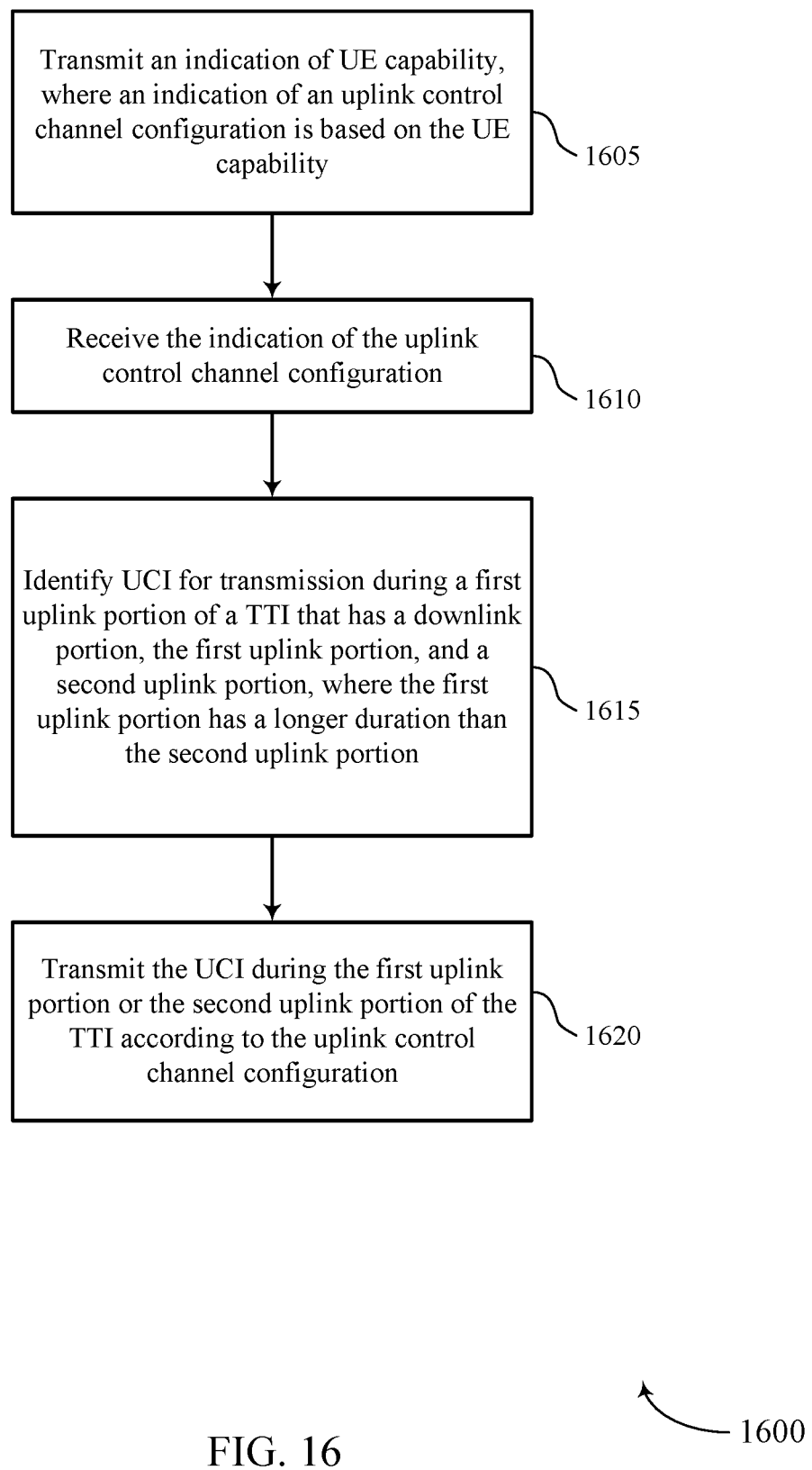

FIG. 16 shows a flowchart illustrating a method 1600 for uplink control channel configurations for wireless communications in accordance with aspects of the present disclosure. The operations of method 1600 may be implemented by a UE 115 or its components as described herein. For example, the operations of method 1600 may be performed by a UE communications manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At block 1605 the UE 115 may transmit an indication of a UE capability, where an indication of an uplink control channel configuration is based at least in part on the UE capability. The operations of block 1605 may be performed according to the methods described with reference to FIGS. 1 through 6. In certain examples, aspects of the operations of block 1605 may be performed by a UE capability component as described with reference to FIGS. 7 through 10.

At block 1610 the UE 115 may receive the indication of the uplink control channel configuration. The operations of block 1610 may be performed according to the methods described with reference to FIGS. 1 through 6. In certain examples, aspects of the operations of block 1610 may be performed by a configuration component as described with reference to FIGS. 7 through 10.

At block 1615 the UE 115 may identify UCI for transmission during a first uplink portion of a TTI that has a downlink portion, the first uplink portion, and a second uplink portion, where the first uplink portion has a longer duration than the second uplink portion. The operations of block 1615 may be performed according to the methods described with reference to FIGS. 1 through 6. In certain examples, aspects of the operations of block 1615 may be performed by a UCI component as described with reference to FIGS. 7 through 10.

At block 1620 the UE 115 may transmit the UCI during the first uplink portion or the second uplink portion of the TTI according to the uplink control channel configuration. The operations of block 1620 may be performed according to the methods described with reference to FIGS. 1 through 6. In certain examples, aspects of the operations of block 1620 may be performed by a transmitter as described with reference to FIGS. 7 through 10.

Figure 17:
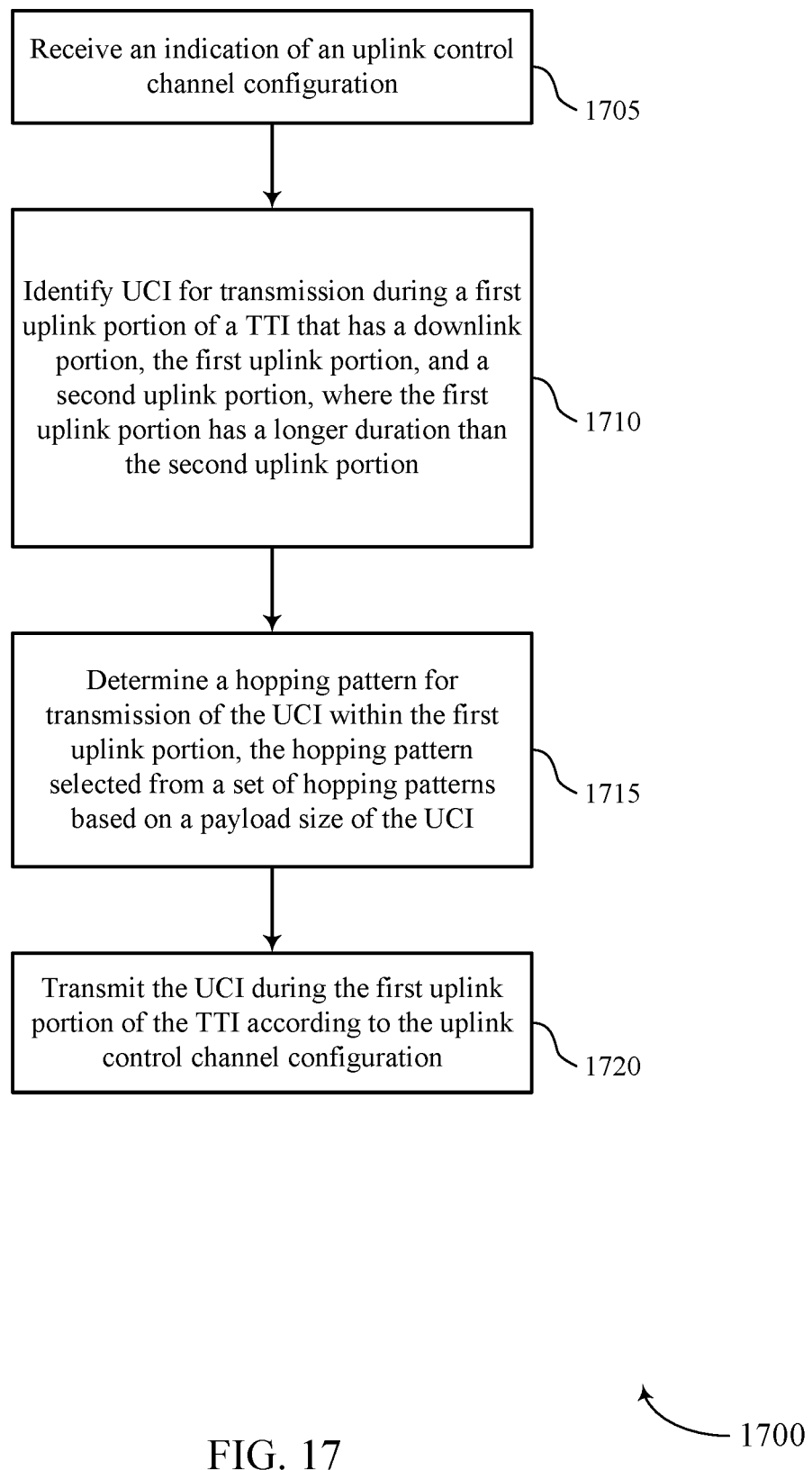

FIG. 17 shows a flowchart illustrating a method 1700 for uplink control channel configurations for wireless communications in accordance with aspects of the present disclosure. The operations of method 1700 may be implemented by a UE 115 or its components as described herein. For example, the operations of method 1700 may be performed by a UE communications manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At block 1705 the UE 115 may receive an indication of an uplink control channel configuration. The operations of block 1705 may be performed according to the methods described with reference to FIGS. 1 through 6. In certain examples, aspects of the operations of block 1705 may be performed by a configuration component as described with reference to FIGS. 7 through 10.

At block 1710 the UE 115 may identify UCI for transmission during a first uplink portion of a TTI that has a downlink portion, the first uplink portion, and a second uplink portion, where the first uplink portion has a longer duration than the second uplink portion. The operations of block 1710 may be performed according to the methods described with reference to FIGS. 1 through 6. In certain examples, aspects of the operations of block 1710 may be performed by a UCI component as described with reference to FIGS. 7 through 10.

At block 1715 the UE 115 may determine a hopping pattern for transmission of the UCI within the first uplink portion, the hopping pattern selected from a set of hopping patterns based at least in part on a payload size of the UCI. The operations of block 1715 may be performed according to the methods described with reference to FIGS. 1 through 6. In certain examples, aspects of the operations of block 1715 may be performed by a hopping component as described with reference to FIGS. 7 through 10.

At block 1720 the UE 115 may transmit the UCI during the first uplink portion of the TTI according to the uplink control channel configuration. The operations of block 1720 may be performed according to the methods described with reference to FIGS. 1 through 6. In certain examples, aspects of the operations of block 1720 may be performed by a transmitter as described with reference to FIGS. 7 through 10.

Figure 18:
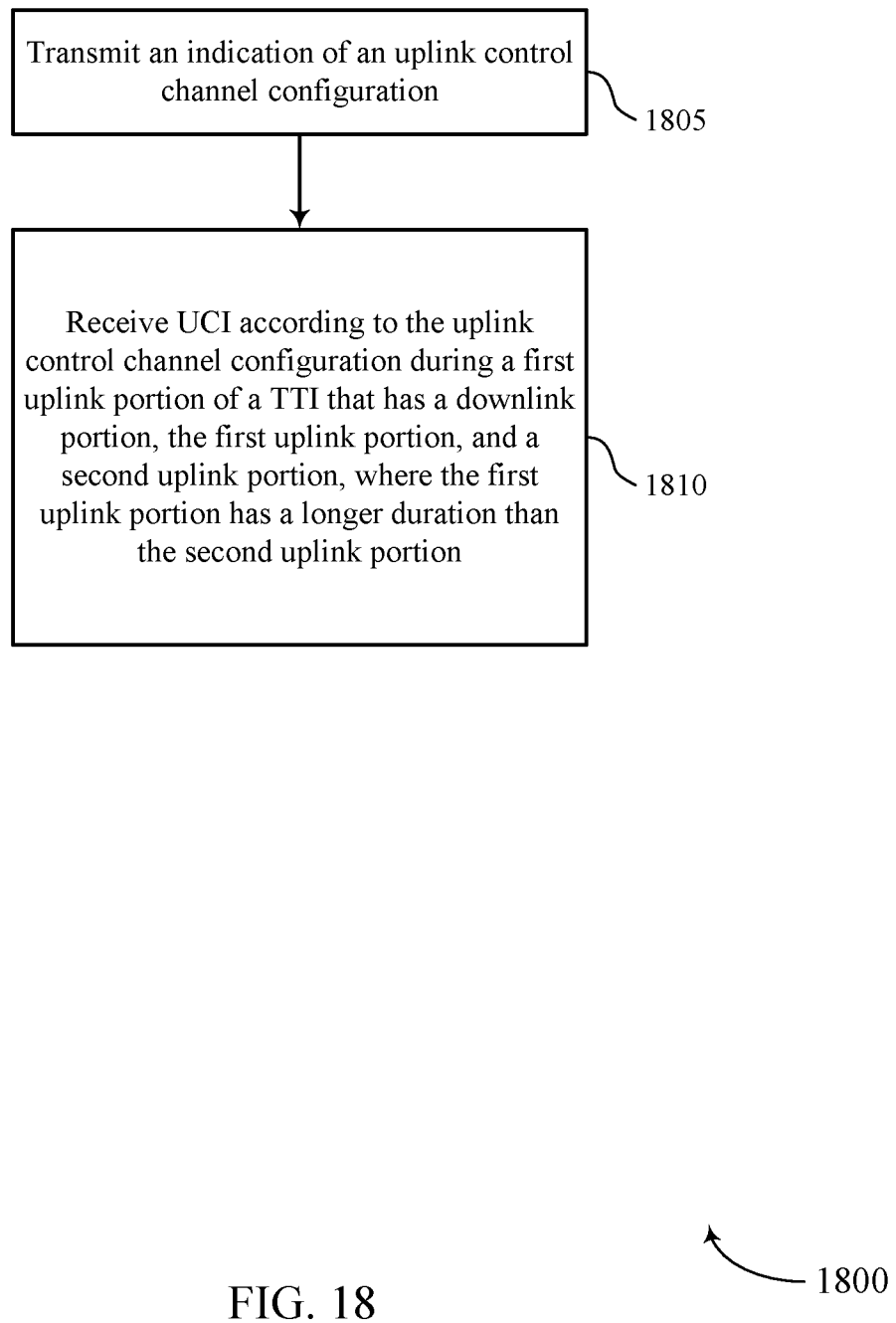

FIG. 18 shows a flowchart illustrating a method 1800 for uplink control channel configurations for wireless communications in accordance with aspects of the present disclosure. The operations of method 1800 may be implemented by a base station 105 or its components as described herein. For example, the operations of method 1800 may be performed by a base station communications manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At block 1805 the base station 105 may transmit an indication of an uplink control channel configuration. The operations of block 1805 may be performed according to the methods described with reference to FIGS. 1 through 6. In certain examples, aspects of the operations of block 1805 may be performed by a configuration component as described with reference to FIGS. 11 through 14.

At block 1810 the base station 105 may receive UCI according to the uplink control channel configuration during a first uplink portion of a TTI that has a downlink portion, the first uplink portion, and a second uplink portion, where the first uplink portion has a longer duration than the second uplink portion. The operations of block 1810 may be performed according to the methods described with reference to FIGS. 1 through 6. In certain examples, aspects of the operations of block 1810 may be performed by a UCI component as described with reference to FIGS. 11 through 14.

Figure 19:
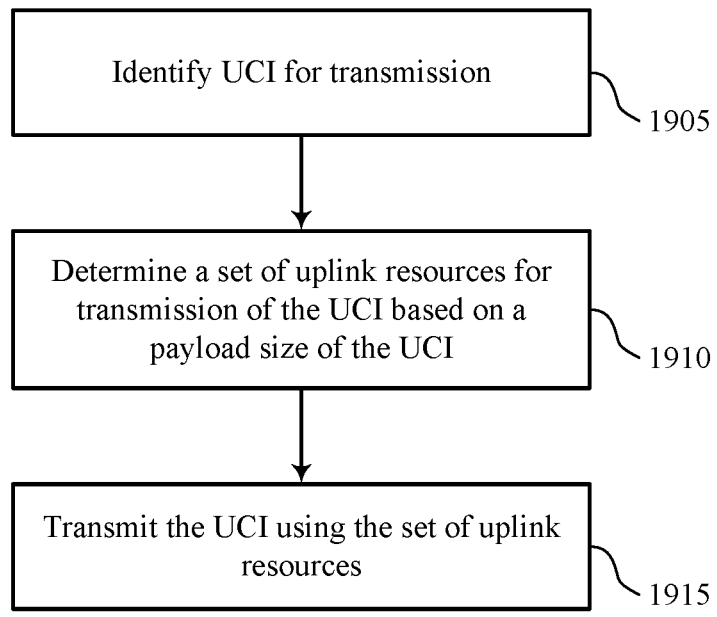

FIG. 19 shows a flowchart illustrating a method 1900 for uplink control channel configurations for wireless communications in accordance with aspects of the present disclosure. The operations of method 1900 may be implemented by a UE 115 or its components as described herein. For example, the operations of method 1900 may be performed by a UE communications manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At block 1905 the UE 115 may identify UCI for transmission. The operations of block 1905 may be performed according to the methods described with reference to FIGS. 1 through 6. In certain examples, aspects of the operations of block 1905 may be performed by a UCI component as described with reference to FIGS. 7 through 10.

At block 1910 the UE 115 may determine a set of uplink resources for transmission of the UCI based at least in part on a payload size of the UCI. The operations of block 1910 may be performed according to the methods described with reference to FIGS. 1 through 6. In certain examples, aspects of the operations of block 1910 may be performed by a resource identifier as described with reference to FIGS. 7 through 10.

At block 1915 the UE 115 may transmit the UCI using the set of uplink resources. The operations of block 1915 may be performed according to the methods described with reference to FIGS. 1 through 6. In certain examples, aspects of the operations of block 1915 may be performed by a transmitter as described with reference to FIGS. 7 through 10.

Figure 20:
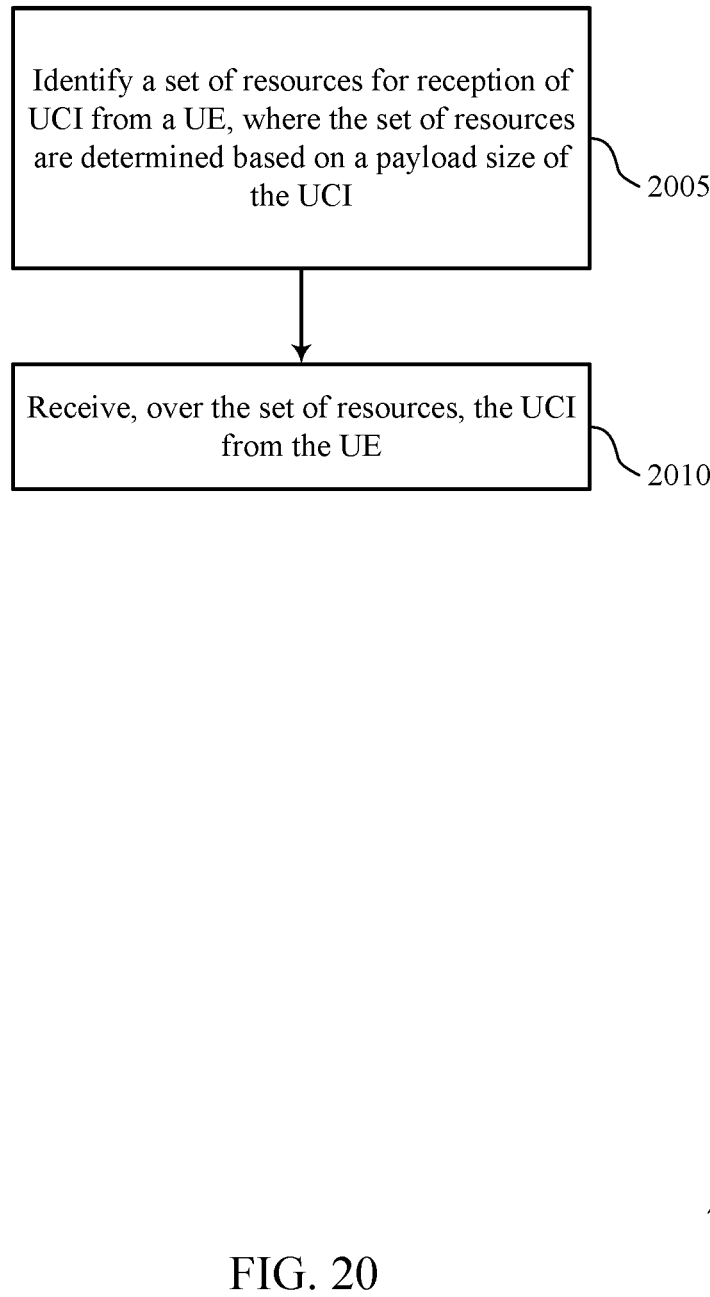

FIG. 20 shows a flowchart illustrating a method 2000 for uplink control channel configurations for wireless communications in accordance with aspects of the present disclosure. The operations of method 2000 may be implemented by a base station 105 or its components as described herein. For example, the operations of method 2000 may be performed by a base station communications manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At block 2005 the base station 105 may identify a set of resources for reception of UCI from a UE, where the set of resources are determined based at least in part on a payload size of the UCI. The operations of block 2005 may be performed according to the methods described with reference to FIGS. 1 through 6. In certain examples, aspects of the operations of block 2005 may be performed by a resource identifier as described with reference to FIGS. 11 through 14.

At block 2010 the base station 105 may receive, over the set of resources, the UCI from the UE. The operations of block 2010 may be performed according to the methods described with reference to FIGS. 1 through 6. In certain examples, aspects of the operations of block 2010 may be performed by a UCI component as described with reference to FIGS. 11 through 14.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term eNB may be generally used to describe the base stations. The wireless communications system or systems described herein may include a heterogeneous LTE/LTE-A or NR network in which different types of eNBs provide coverage for various geographical regions. For example, each eNB, gNB, or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNB, gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications systems 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication performed by a user equipment (UE), comprising:
   receiving an indication of an uplink configuration, wherein the uplink configuration comprises one or more of a starting position or a duration for resources of a physical uplink control channel (PUCCH);
   identifying uplink control information (UCI) for transmission during a first uplink portion of a slot, wherein the slot includes the first uplink portion and a second uplink portion, and wherein the first uplink portion has a longer duration than the second uplink portion;
   determining a hopping pattern for transmission of the UCI within the first uplink portion having the longer duration, the hopping pattern for transmission of the UCI occurring within the first uplink portion and not extending into the second uplink portion;
   determining PUCCH resources for transmitting the UCI based at least in part on whether a payload size of the UCI exceeds a threshold size; and
   transmitting the UCI during the first uplink portion of the slot according to the hopping pattern, the starting position, and the duration for the determined PUCCH resources.

2. The method of claim 1, further comprising:
   transmitting an indication of a user equipment (UE) capability, wherein the indication of the uplink configuration is in accordance with the UE capability.

3. The method of claim 1,
   wherein the hopping pattern is selected from a set of hopping patterns based at least in part on a payload size of the UCI.

4. The method of claim 3, further comprising:
   determining a symbol index for a demodulation reference signal (DMRS) for the hopping pattern, wherein the symbol index comprises a same value for each hopping pattern of the set of hopping patterns.

5. The method of claim 1, wherein at least a portion of an uplink control channel having the uplink configuration overlaps at least a portion of a gap interval between a downlink portion of the slot and the first uplink portion of the slot.

6. The method of claim 5, wherein the uplink configuration comprises a first code for multiplexing UEs during the gap interval and a second code for multiplexing UEs during the first uplink portion of the slot.

7. The method of claim 1, wherein transmitting the UCI comprises:
   transmitting a first portion of the UCI during the first uplink portion and a second portion of the UCI during the second uplink portion of the slot.

8. The method of claim 1, wherein receiving the indication comprises:
   receiving the indication of the uplink configuration via a downlink control information (DCI) message.

9. The method of claim 8, wherein the DCI message comprises a physical downlink control channel (PDCCH).

10. The method of claim 8, wherein the DCI message comprises a UE-specific PDCCH message or a common PDCCH message.

11. The method of claim 8, wherein the determined PUCCH resources are based at least in part on a number of symbols of a downlink portion of the slot occupied by a physical downlink control channel (PDCCH) or a number of symbols of the second uplink portion of the slot, or both.

12. The method of claim 1, wherein the uplink configuration indicates a number of orthogonal frequency division multiplexing (OFDM) symbols of the first uplink portion of the slot, a number of OFDM symbols of the second uplink portion of the slot, or a number of OFDM symbols of a downlink portion of the slot, or any combination thereof.

13. The method of claim 1, wherein the uplink configuration is received via a system information block (SIB) or radio resource control (RRC) signaling.

14. The method of claim 1, further comprising:
   refraining from decoding a physical control format indicator channel or a physical downlink control channel based at least in part on receiving the indication of the uplink configuration.

15. The method of claim 1, further comprising:
   determining whether a UCI payload of the second uplink portion spans an allocated bandwidth of the slot, wherein identifying the UCI for transmission during the first uplink portion is based at least in part on determining whether the UCI payload of the second uplink portion spans the allocated bandwidth.

16. The method of claim 15, further comprising:
   determining that the UCI payload of the second uplink portion does not span the allocated bandwidth, wherein identifying the UCI for transmission during the first uplink portion comprises:
   identifying that a part of the UCI for transmission during the first uplink portion extends into at least a part of the second uplink portion based at least in part on determining that the UCI payload of the second uplink portion does not span the allocated bandwidth.

17. The method of claim 1, wherein identifying the UCI is based at least in part on a duration of one or more PUCCH portions.

18. A method for wireless communication performed by a network entity, comprising:
   transmitting an indication of an uplink configuration, wherein the uplink configuration comprises one or more of a starting position or a duration for resources of a physical uplink control channel (PUCCH);

determining a hopping pattern for transmission of uplink control information (UCI) within a first uplink portion; and receiving the UCI during the first uplink portion or a second uplink portion of a slot according to the hopping pattern, the starting position, and the duration, the hopping pattern for transmission of the UCI occurring within the first uplink portion and not extending into the second uplink portion.

19. The method of claim 18, further comprising:

receiving an indication of a user equipment (UE) capability, wherein the indication of the uplink configuration is in accordance with the UE capability.

20. The method of claim 18, wherein the hopping pattern is selected from a set of hopping patterns based at least in part on a payload size of the UCI.

21. The method of claim 18, wherein receiving the UCI comprises:

receiving at least a first portion of the UCI during the first uplink portion and a second portion during the second uplink portion of the slot.

22. The method of claim 18, wherein transmitting the indication of the uplink configuration comprises:

transmitting the indication of the uplink configuration via a downlink control information (DCI) message.

23. The method of claim 22, wherein the DCI message comprises a physical downlink control channel (PDCCH).

24. The method of claim 22, wherein the DCI message comprises a UE-specific PDCCH message or a common PDCCH message.

25. The method of claim 22, wherein the resources of the PUCCH are based at least in part on a number of symbols of a downlink portion of the slot occupied by a physical downlink control channel (PDDCH) or a number of symbols of the second uplink portion of the slot, or both.

26. The method of claim 18, wherein the uplink configuration indicates a number of orthogonal frequency division multiplexing (OFDM) symbols of the first uplink portion of the slot, a number of OFDM symbols of the second uplink portion of the slot, or a number of OFDM symbols of a downlink portion of the slot, or any combination thereof.

27. The method of claim 18, wherein the uplink configuration is transmitted via a system information block (SIB) or radio resource control (RRC) signaling.

28. An apparatus for wireless communication, comprising:

means for receiving an indication of an uplink configuration, wherein the uplink configuration comprises one or more of a starting position or a duration for resources of a physical uplink control channel (PUCCH);

means for identifying uplink control information (UCI) for transmission during a first uplink portion of a slot, wherein the slot includes the first uplink portion and a second uplink portion, and wherein the first uplink portion has a longer duration than the second uplink portion;

means for determining a hopping pattern for transmission of the UCI within the first uplink portion having the longer duration, the hopping pattern for transmission of the UCI occurring within the first uplink portion and not extending into the second uplink portion;

means for determining PUCCH resources for transmitting the UCI based at least in part on whether a payload size of the UCI exceeds a threshold size; and means for transmitting the UCI during the first uplink portion of the slot according to the hopping pattern, the starting position, and the duration for the determined PUCCH resources.

29. An apparatus for wireless communication, comprising:

means for transmitting an indication of an uplink configuration, wherein the uplink configuration comprises one or more of a starting position or a duration for resources of a physical uplink control channel (PUCCH);

means for determining a hopping pattern for transmission of uplink control information (UCI) within a first uplink portion; and means for receiving the UCI during the first uplink portion or a second uplink portion of a slot according to the hopping pattern, the starting position, and the duration, the hopping pattern for transmission of the UCI occurring within the first uplink portion and not extending into the second uplink portion.

30. An apparatus for wireless communication, comprising:

a processor;

memory coupled with the processor; and instructions stored in the memory and executable by the processor to cause the apparatus to:

receive an indication of an uplink configuration, wherein the uplink configuration comprises one or more of a starting position or a duration for resources of a physical uplink control channel (PUCCH);

identify uplink control information (UCI) for transmission during a first uplink portion of a slot, wherein the slot includes the first uplink portion and a second uplink portion, and wherein the first uplink portion has a longer duration than the second uplink portion;

determine a hopping pattern for transmission of the UCI within the first uplink portion having the longer duration, the hopping pattern for transmission of the UCI occurring within the first uplink portion and not extending into the second uplink portion;

determine PUCCH resources for transmitting the UCI based at least in part on whether a payload size of the UCI exceeds a threshold size; and transmit the UCI during the first uplink portion of the slot according to the hopping pattern, the starting position, and the duration for the determined PUCCH resources.

31. The apparatus of claim 30, wherein the instructions are further executable by the processor to cause the apparatus to:

transmit an indication of a user equipment (UE) capability, wherein the indication of the uplink configuration is in accordance with based-at-least-in-par-t-on the UE capability.

32. The apparatus of claim 30, wherein the hopping pattern is selected from a set of hopping patterns based at least in part on a payload size of the UCI.

33. The apparatus of claim 30, wherein the instructions are further executable by the processor to cause the apparatus to:

receive the indication via a downlink control information (DCI) message and the uplink configuration via a system information block (SIB) or radio resource control (RRC) signaling.

34. An apparatus for wireless communication, comprising:

a processor;

memory coupled with the processor; and instructions stored in the memory and executable by the processor to cause the apparatus to:
- transmit an indication of an uplink configuration, wherein the uplink configuration comprises one or more of a starting position or a duration for resources of a physical uplink control channel (PUCCH);
- determine a hopping pattern for transmission of uplink control information (UCI) within a first uplink portion; and
- receive the UCI during the first uplink portion or a second uplink portion of a slot according to the hopping pattern, the starting position, and the duration, the hopping pattern for transmission of the UCI occurring within the first uplink portion and not extending into the second uplink portion.

35. A non-transitory computer-readable medium storing code for wireless communication, the code comprising instructions executable by a processor to:
- receive an indication of an uplink configuration, wherein the uplink configuration comprises one or more of a starting position or a duration for resources of a physical uplink control channel (PUCCH);
- identify uplink control information (UCI) for transmission during a first uplink portion of a slot, wherein the slot includes the first uplink portion and a second uplink portion, and wherein the first uplink portion has a longer duration than the second uplink portion;
- determine a hopping pattern for transmission of the UCI within the first uplink portion having the longer duration, the hopping pattern for transmission of the UCI occurring within the first uplink portion and not extending into the second uplink portion;
- determine PUCCH resources for transmitting the UCI based at least in part on whether a payload size of the UCI exceeds a threshold size; and
- transmit the UCI during the first uplink portion of the slot according to the hopping pattern, the starting position, and the duration for the determined PUCCH resources.

36. A non-transitory computer-readable medium storing code for wireless communication, the code comprising instructions executable by a processor to:
- transmit an indication of an uplink configuration, wherein the uplink configuration comprises one or more of a starting position or a duration for resources of a physical uplink control channel (PUCCH);
- determine a hopping pattern for transmission of uplink control information (UCI) payload within a first uplink portion; and
- receive the UCI during the first uplink portion or a second uplink portion of a slot according to the hopping pattern, the starting position, and the duration, the hopping pattern for transmission of the UCI occurring within the first uplink portion and not extending into the second uplink portion.

* * * * *